(12) United States Patent
Gelfenbeyn et al.

(10) Patent No.: US 12,417,370 B2
(45) Date of Patent: *Sep. 16, 2025

(54) AUTOMATED ASSISTANT INVOCATION OF APPROPRIATE AGENT

(71) Applicant: GOOGLE LLC, Mountain View, CA (US)

(72) Inventors: Ilya Gennadyevich Gelfenbeyn, Sunnyvale, CA (US); Artem Goncharuk, Mountain View, CA (US); Pavel Sirotin, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 1575 days.

This patent is subject to a terminal disclaimer.

(21) Appl. No.: 16/135,024

(22) Filed: Sep. 19, 2018

(65) Prior Publication Data
US 2019/0019112 A1    Jan. 17, 2019

Related U.S. Application Data

(63) Continuation of application No. 15/951,679, filed on Apr. 12, 2018, now abandoned, which is a
(Continued)

(51) Int. Cl.
*G06N 3/006*        (2023.01)
*G06F 9/54*         (2006.01)
(Continued)

(52) U.S. Cl.
CPC ............ *G06N 3/004* (2013.01); *G06F 9/54* (2013.01); *G06F 16/3329* (2019.01);
(Continued)

(58) Field of Classification Search
CPC ...... G06N 99/005; G06N 5/022; G06N 5/025; G06N 5/00; G06N 7/005; G06N 3/08;
(Continued)

(56) References Cited

U.S. PATENT DOCUMENTS

| 7,562,009 B1 | 7/2009 | Emerson et al. |
| 9,990,591 B2 | 6/2018 | Gelfenbeyn et al. |

(Continued)

FOREIGN PATENT DOCUMENTS

| CA | 2787351 | 7/2011 |
| CN | 102792320 | 11/2012 |

(Continued)

OTHER PUBLICATIONS

"Using Personal Assistant Dialogs for Automatic Web Service Discovery and Execution" Marcio Fuckner et al (Year: 2013).*
(Continued)

*Primary Examiner* — Luis A Sitiriche
(74) *Attorney, Agent, or Firm* — Gray Ice Higdon

(57) ABSTRACT

Invoking an agent during a dialog between a user and an automated assistant. Some implementations are directed to receiving, during a human-to-automated assistant dialog, natural language input of the user that indicates a desire to engage an agent, but that fails to indicate a particular agent to be engaged. Those implementations are further directed to selecting a particular agent from a plurality of available agents, and transmitting an invocation request to the selected particular agent. In some implementations an agent selection model can be utilized in selecting the particular agent, such as a machine learning model. The machine learning model can be trained to enable generation of output that indicates, for each of a plurality of available agents (and optionally intent(s) for those agents), a probability that the available agent (and optionally intent) will generate appropriate responsive content.

12 Claims, 10 Drawing Sheets

Related U.S. Application Data continuation of application No. 15/490,060, filed on Apr. 18, 2017, now Pat. No. 9,990,591.

(60) Provisional application No. 62/323,868, filed on Apr. 18, 2016.

(51) Int. Cl.

| | |
|---|---|
| *G06F 16/3329* | (2025.01) |
| *G06N 3/004* | (2023.01) |
| *G06N 20/00* | (2019.01) |
| *G10L 15/18* | (2013.01) |
| *G10L 15/22* | (2006.01) |
| *G10L 15/30* | (2013.01) |

(52) U.S. Cl.
CPC ............ *G06N 3/006* (2013.01); *G06N 20/00* (2019.01); *G10L 15/1815* (2013.01); *G10L 15/22* (2013.01); *G10L 15/30* (2013.01); *G10L 2015/223* (2013.01)

(58) Field of Classification Search
CPC .......... G06N 5/04; G06N 7/08; G06N 99/002; G06N 3/008; G06N 5/048
See application file for complete search history.

(56) References Cited

U.S. PATENT DOCUMENTS

| | | | |
|---|---|---|---|
| 2002/0143598 A1 | 10/2002 | Scheer | |
| 2002/0156629 A1 | 10/2002 | Carberry et al. | |
| 2004/0267535 A1 | 12/2004 | Kotzin | |
| 2008/0107256 A1 | 5/2008 | Jaiswal et al. | |
| 2009/0150156 A1 | 6/2009 | Kennewick et al. | |
| 2013/0185081 A1 | 7/2013 | Cheyer et al. | |
| 2013/0311997 A1 | 11/2013 | Gruber et al. | |
| 2014/0081633 A1 | 3/2014 | Badaskar | |
| 2015/0081361 A1 | 3/2015 | Lee et al. | |
| 2015/0113627 A1 | 4/2015 | Curtis | |
| 2018/0232664 A1 | 8/2018 | Gelfenbeyn et al. | |

FOREIGN PATENT DOCUMENTS

| | | |
|---|---|---|
| CN | 104267928 | 1/2015 |
| CN | 104335234 | 2/2015 |
| JP | 2002518725 | 6/2002 |
| JP | 2002523828 | 7/2002 |
| JP | 2005242243 A | 8/2005 |
| JP | 2007323233 | 12/2007 |
| JP | 2008090545 A | 4/2008 |
| JP | 2009528619 | 8/2009 |
| JP | 2013517566 | 5/2013 |
| JP | 201552814 | 9/2015 |
| JP | 2015528140 | 9/2015 |
| KR | 20010083051 | 8/2001 |
| KR | 20130105042 | 9/2012 |
| KR | 20120136417 | 12/2012 |
| KR | 20120138826 | 12/2012 |
| KR | 20140052155 | 5/2014 |
| KR | 20150013631 | 2/2015 |
| WO | 0011571 | 3/2000 |
| WO | 2007106269 | 9/2007 |
| WO | 2011088053 | 7/2011 |
| WO | 2013173504 | 11/2013 |
| WO | 2014203495 A1 | 2/2017 |

OTHER PUBLICATIONS

European Patent Office; Intention to Grant issued in Application No. 17722916.8 dated Mar. 7, 2019.
Korean Intellectual Property Office; Notice of Allowance issue in Application Ser. No. KR 10-2020-7032178; 3 pages; dated May 28, 2021.
Korean Intellectual Property Office; Notice of Office Action issue in Application Ser. No. KR 10-2018-7033048; dated Mar. 5, 2020.
European Patent Office; Extended European Search Report of European Application 19186948.6; 8 pages; dated Dec. 12, 2019.
European Patent Office; Intention to Grant; 62 pages; dated Mar. 7, 2019.
Japanese Patent Office; Notice of Reasons for Rejection; 6 pages; dated Nov. 18, 2019.
Written Opinion of the International Preliminary Examining Authority for IA No. PCT/US2017/028110; 7 pages; dated Feb. 28, 2018.
International Search Report and Written Opinion of PCT Ser. No. PCT/US2017/028110, dated Jul. 10, 2017.
European Patent Office; International Preliminary Report on Patentability of International Application No. PCT/US2017/028110, dated Jun. 11, 2018.
China National Intellectual Property Administration; Notice of Allowance issued in Application No. 201780082118.7; 4 pages; dated Sep. 24, 2021.
European Patent Office; Intention to Grant issued in U.S. Appl. No. 19/186,948; 63 pages; dated Oct. 15, 2021.
Intellectual Property India; Examination Report issue in Application No. 201847004005; 7 pages; dated Nov. 4, 2020.
Korean Intellectual Property Office; Notice of Office Action issued in Application No. KR 10-2021-7027561; 8 pages; dated May 9, 2022.
Japanese Patent Office; Notice of Allowance for Japanese application No. 2019-505342; 3 pages, dated Mar. 2, 2020.
Japanese Patent Office; Notice of Reasons for Rejection issued in Application No. 2020-063001; 11 pages; dated Aug. 2, 2021.
Japanese Patent Office; Notice of Allowance issued in Application No. 2020-063001, 3 pages, dated Mar. 22, 2022.
China National Intellectual Property Administration; Notification of Frist Office Action issued in Application No. 201780028118.7; 20 pages; dated Mar. 11, 2021.
Weeratunga, A.M. et al.; Projec Nethra—an intelligent assistant for the visually disabled to interact with internet services; IEEE Conference Publication; dated 2015.
Wang, Shang; Design and Research on Android Voice Assistant; Silicon Valley; dated Dec. 31, 2012.
Korean Intellectual Property Office; Notice of Allowance issue in Application Ser. No. KR 10-20217027561; 5 pages; dated Nov. 2, 2023.
Korean Intellectual Property Office; Notice of Allowance issue in Application Ser. No. KR 10-2018-7033048; 7 pages; dated Aug. 11, 2020.
Japanese Patent Office; Office Action issued in Application No. 2020-063001; 4 pages; dated Mar. 15, 2021.
European Patent Office; Extended European Search Report issued in Application No. 22158440.2, 14 pages, dated Jun. 21, 2022.
Korean Intellectual Property Office; Notice of Office Action issued in Application Ser. No. 10-2021-7027561; 14 pages; dated Oct. 26, 2021.
Japanese Patent Office; Office Action issued in Application No. 2019-505342, dated Nov. 18, 2019.
Japanese Patent Office; Notice of Reasons for Rejection issued in Japanese Application No. 2022-069446; 7 pages, dated Jun. 5, 2023.
European Patent Office; Intention to Grant issued in Application No. 22158440.2; 63 pages; dated Nov. 20, 2023.
Intellectual Property India; Hearing Notice issued in Application No. 201847004005; 3 pages; dated Jan. 24, 2024.
European Patent Office, Communication issued in Application 24165306.2; 14 pages; dated Sep. 13, 2024.
Japanese Patent Office; Notice of Refusal issued in Application No. 2023-172099; 6 pages; dated Dec. 23, 2024.

\* cited by examiner

AUTOMATED ASSISTANT INVOCATION OF APPROPRIATE AGENT

BACKGROUND

An automated assistant (also known as "personal assistant", "mobile assistant", etc.) may be interacted with by a user via a variety of client devices, such as smart phones, tablet computers, wearable devices, automobile systems, standalone personal assistant devices, and so forth. An automated assistant receives input from the user (e.g., typed and/or spoken natural language input) and responds with responsive content (e.g., visual and/or audible natural language output). An automated assistant interacted with via a client device may be implemented via the client device itself and/or via one or more remote computing devices that are in network communication with the client device (e.g., computing device(s) in "the cloud").

SUMMARY

This specification is directed generally to methods, systems, and computer-readable media for invoking an agent during a dialog between a user and an automated assistant. Invoking an agent can include transmitting (e.g., utilizing an application programming interface (API)) an invocation request that includes value(s) for invocation parameter(s) (e.g., a value for an intent parameter, value(s) for intent slot parameter(s), and/or value(s) for other parameter(s)), and that causes the agent to generate content for presentation to the user via one or more user interface output devices (e.g., via one or more of the user interface output devices utilized in the dialog with the automated assistant). The responsive content generated by the agent can be tailored to the invocation parameters of the invocation request.

Some implementations are directed to receiving, during a human-to-automated assistant dialog, natural language input of the user that indicates a desire to engage an agent, but that fails to indicate a particular agent to be engaged. For example, "book me a hotel in Chicago" indicates a desire to engage an agent with a "hotel booking" intent parameter and a "Chicago" location parameter, but fails to specify the particular agent to invoke. Those implementations are further directed to selecting a particular agent from a plurality of available agents, and transmitting an invocation request to the selected particular agent. For example, the invocation request can be transmitted to the selected particular agent without transmission of the invocation request to any other of the available agents. In some of those implementations, a particular agent and a particular intent for the particular agent are selected (e.g., when the particular agent is operable to generate responsive content in response to any one of multiple disparate intents).

In some of the implementations that select a particular agent from a plurality of available agents, an agent selection model is utilized in selecting the particular agent. In some versions of those implementations, the agent selection model includes at least one machine learning model, such as a deep neural network model. The machine learning model can be trained to enable generation of output that indicates, for each of a plurality of available agents (and optionally intent(s) for those agents), a probability that the available agent (and optionally intent) will generate appropriate responsive content. The generated output is based on input applied to the machine learning model, where the input is based on: a current dialog with an automated assistant, and optionally additional contextual values. For example, the input based on the current dialog can include various values based on most recent natural language input provided to the automated assistant in the current dialog and/or past natural language input provided in the current dialog. Also, the optional additional contextual values can include, for example, client device contextual values such as values(s) based on: historical interactions of a user of the client device, currently rendered and/or recently rendered content on the client device, a location of the client device, current date and/or time, etc.

In some implementations, where the agent selection model includes at least one machine learning model, at least one of the machine learning models can be trained based on training instances that are based on past interactions with the available agents.

As one example, a plurality of training instances can each be generated based on a corresponding agent request generated based on natural language input provided during a corresponding human-to-automated assistant dialog (e.g., natural language input that failed to identify a particular agent). An agent request can be transmitted to each of a plurality of available agents (e.g., to all available agents), and responses received from one or more of the available agents to which the agent request was transmitted. Each of the training instances can include training instance input that is based on: the agent request (e.g., the corresponding natural language input and optionally contextual values), and training instance output that is based on the response(s). The responses can each indicate an ability of a corresponding one of the agents to resolve the agent request. For example, the response from a given agent can be a binary indication (e.g., "resolvable", "not resolvable"; or "responsive content", "no responsive content/error"), a non-binary confidence measure (e.g., "70% likely resolvable"), actual responsive content (or no content/an error), etc. Also, for example, receipt of a response from a given agent can indicate it is able to respond, whereas no response from the given agent can indicate it is unable to respond. The agent request can be transmitted to the agents without active invocation of the available agents in the dialog. For example, the agent request can be similar to an invocation request, but include a "non-invocation" flag and/or other indication that the agent should not be immediately invoked. Also, for example, the responses can additionally or alternatively be processed by the automated assistant without providing any corresponding content in a dialog.

Such a machine learning model, once trained, can be utilized to predict, based on a current dialog (e.g., natural language input of the current dialog and optionally contextual value(s)), a probability for each of a plurality of available agents (and optionally intents)—where each of the probabilities indicates a probability (e.g., binary or non-binary) that the agent is capable of appropriately handling an invocation request that is based on the dialog. Selection of a particular agent can be based at least in part on such probabilities, and the invocation request transmitted to only the particular agent.

In some implementations, at least one of the machine learning models can be generated based on natural language inputs provided to agents after invocation of the agents. For example, natural language inputs provided to agents immediately after invocation of the agents can be stored in association with the agents. For instance, the natural language inputs can be those provided to agents immediately after invocations that are "bare" invocations. A bare invocation of an agent is an invocation of the agent based on an invocation request that is directed to the agent, but that does not include a value for an intent parameter and/or that does not include a value for any intent slot parameters. For example, in response to natural language input of "open Agent X", a bare invocation of "Agent X" can occur in response to an invocation request transmitted to "Agent X" that does not include any value for an intent parameter and that does not include any value for any intent slot parameters. Also, for example, in response to natural language input of "set a reminder with Agent X", a bare invocation of "Agent X" can occur in response to an invocation request transmitted to "Agent X" that includes a "reminder" value for an intent parameter, but that does not include any value for any intent slot parameters. A selection model can be generated that includes mappings (or other associations) between natural language inputs and the corresponding agent(s) (and optionally intent) to which the natural language inputs were provided. In this manner, the mappings are based on initial dialog provided by users after bare invocations of agents, which enables generation of an agent selection model that provides insight to which agent(s) are most likely to be adept to responding to various natural language inputs. Additional and/or alternative selection model(s) can be utilized in selecting a particular agent. As one example, a selection model that is generated based on past explicit selections of agents by various users may additionally or alternatively be utilized in selecting a particular agent.

In some implementations, various additional and/or alternative criteria are utilized in selecting a particular agent (and optionally intent). As one example, agent requests can be transmitted "live" to a plurality of candidate agents (as described above), and responses from those agents analyzed in determining selecting the particular agent to invoke. As another example, the additional and/or alternative criteria can include historical interactions of a user of the client device (e.g., how often the particular agent is utilized by the user, how recently the particular agent was utilized by the user), currently rendered and/or recently rendered content on the client device (e.g., does the content correspond to agent feature(s)), a location of the client device, current date and/or time, a ranking of the particular agent (e.g., a ranking by a population of users), a popularity of the particular agent (e.g., popularity among a population of users), etc. In implementations where machine learning model(s) are utilized in selecting a particular agent, such criteria can be applied as input to the machine learning model(s) and/or considered in combination with output generated over the machine learning model(s).

Various techniques described above and/or elsewhere herein enable selection of a particular agent, and may increase the likelihood that the selected particular agent is able to appropriately handle an invocation request. This may mitigate risk that the particular agent selected for invocation is unable to perform the intent of the invocation request (optionally with the values for additional parameters of the invocation request), which may conserve various computational resources. For example, it may conserve network and/or processor resources that may otherwise be consumed by an initial failed attempt to utilize an agent to perform the intent, which is then followed by invoking an alternative agent in another attempt to perform the intent. Moreover, in implementations where a particular agent is selected without prompting a user to choose between multiple available agents, it may reduce the number of "turns" of a human-to-automated assistant dialog that are required before invocation. This may also conserve various network and/or processor resources that would otherwise be consumed by such turns. Further, in implementations that utilize a trained machine learning model, the trained machine learning model may be utilized to determine probabilities that agents could handle a particular invocation—without necessitating the network resources be consumed through "live" interactions with one or more of the agents to make such a determination. This may also conserve various network and/or processor resources that would otherwise be consumed in such live interactions.

In some situations, in response to invocation of a particular agent according to techniques disclosed herein, a human-to-automated assistant dialog may be at least temporarily transferred (actually or effectively) to the particular agent. For example, output that is based on responsive content of the particular agent may be provided to the user in furtherance of the dialog, and further user input received in response to the output. The further user input (or a conversion thereof) may be provided to the particular agent. The particular agent may utilize its own semantic engines and/or other components in generating further responsive content that can be used to generate further output for providing in furtherance of the dialog. This general process may continue until, for example, the particular agent provides responsive content that terminates the particular agent dialog (e.g., an answer or resolution instead of a prompt), additional user interface input of the user terminates the particular agent dialog (e.g., instead invokes a response from the automated assistant or another agent), etc.

In some situations, the automated assistant may still serve as an intermediary when the dialog is effectively transferred to the particular agent. For example, in serving as an intermediary where natural language input of a user is voice input, the automated assistant may convert that voice input to text, provide the text (and optionally annotations of the text) to the particular agent, receive responsive content from the particular agent, and provide output that is based on the particular responsive content for presentation to the user. Also, for example, in serving as an intermediary, the automated assistant may analyze user input and/or responsive content of the particular agent to determine if dialog with the particular agent should be terminated, if the user should be transferred to an alternate agent, if global parameter values should be updated based on the particular agent dialog, etc. In some situations, the dialog may be actually transferred to the particular agent (without the automated assistant serving as an intermediary once transferred), and optionally transferred back to the automated assistant upon occurrence of one or more conditions such as termination by the particular agent (e.g., in response to completion of an intent via the particular agent).

Implementations described herein enable an automated assistant to select an appropriate agent based on dialog with a user, and invoke the agent to achieve an intent of the user that is indicated by the user in the dialog. These implementations may enable a user to engage an agent via interaction with an automated assistant, without necessitating the user know "invocation phrase(s)" to explicitly trigger the agent and/or without necessitating the user even initially know the agent exists. Moreover, implementations may enable the user to utilize a common automated assistant interface (e.g., an audible/voice-based interface and/or graphical interface) to invoke with any of a plurality of disparate agents that enable performance of actions across a plurality of disparate intents. For example, the common automated assistant interface may be utilized to engage any one of a plurality of agents that handle a "restaurant reservation" intent, engage any one of a plurality of agents that handle a "purchasing professional services" intent, engage any one of a plurality of agents that handle a "telling jokes" intent, engage any one of a plurality of agents that handle a "reminder" intent, engage any one of a plurality of agents that handle a "purchasing travel services" intent, and/or engage any one of a plurality of agents that handle an "interactive game" intent.

As used herein, an "agent" references one or more computing devices and/or software that is separate from an automated assistant. In some situations, an agent may be a third-party (3P) agent, in that it is managed by a party that is separate from a party that manages the automated assistant. The agent is configured to receive (e.g., over a network and/or via an API) an invocation request from the automated assistant. In response to receiving the invocation request, the agent generates responsive content based on the invocation request, and transmits the responsive content for the provision of output that is based on the responsive content. For example, the agent may transmit the responsive content to the automated assistant for provision of output, by the automated assistant, that is based on the responsive content. As another example, the agent can itself provide the output. For instance, the user can interact with the automated assistant via a client device (e.g., the automated assistant can be implemented on the client device and/or in network communication with the client device) and the agent can be an application installed on the client device or an application executable remote from the client device, but "streamable" on the client device. When the application is invoked, it can be executed by the client device and/or brought to the forefront by the client device (e.g., its content can take over a display of the client device).

Various types of input are described herein that may be provided by a user, via user interface input device(s), to an automated assistant and/or to an agent. In some instances, the input may be natural language input that is free-form, such as textual input that is based on user interface input generated by the user via one or more user interface input devices (e.g., based on typed input provided via a physical or virtual keyboard or based on spoken input provided via a microphone). As used herein, free-form input is input that is formulated by a user and that is not constrained to a group of options presented for selection by the user (e.g., not constrained to a group of options presented in a drop-down menu).

In some implementations, a method performed by one or more processors is provided and includes receiving a natural language input instance generated based on user interface input during a human-to-automated assistant dialog. The method further includes, prior to invoking any agent in response to the natural language input instance: generating an agent request based on the natural language input instance; selecting, for the agent request, a set of multiple agents from a corpus of available agents; transmitting the agent request to each of the multiple agents of the set; receiving, from at least a subset of the multiple agents in response to the transmitting, a corresponding response to the request; determining, from each of the responses, a relative ability of an agent providing the response to generate responsive content in response to the agent request; and selecting a particular agent of the multiple agents based on at least one of the responses. The method further includes invoking the particular agent responsive to the natural language input and based on selecting the particular agent. Invoking the particular agent causes responsive content generated by the particular agent to be provided for presentation via one or more user interface output devices. In some implementations, only the selected particular agent is invoked in responsive to receiving the natural language input.

These and other implementations of technology disclosed herein may optionally include one or more of the following features.

In some implementations, the method further includes: storing, in one or more computer readable media, an association of the agent request to at least one of the agents determined to be able to respond to the agent request; and generating an agent selection model based on the stored association between the agent request and the at least one of the agents determined to be able to respond to the agent request. In some of those implementations, the method further includes, subsequent to generating the agent selection model: receiving additional natural language input in an additional human-to automated assistant dialog; selecting an additional agent, of the multiple agents, based on the additional natural language input and the agent selection model; and responsive to the additional natural language input and based on selecting the additional agent: transmitting an additional invocation request to the additional agent. The additional invocation request invokes the additional agent. In response to receiving the additional natural language input, the additional invocation request is optionally transmitted to only the selected additional agent.

In some implementations, selecting the particular agent is further based on: a quantity of interactions with the particular agent by a user engaged in the dialog; a recency of interaction with the particular agent by the user; and/or a ranking or popularity of the particular agent among a population of users.

In some implementations, a method performed by one or more processors is provided and includes, for each of a plurality of natural language input instances generated based on user interface input during human-to-automated assistant dialogs: generating an agent request based on the natural language input instance; selecting, for the agent request, a set of multiple agents from a corpus of available agents; transmitting, via one or more application programming interfaces, the agent request to each of the multiple agents of the set; receiving, from each of the multiple agents in response to the transmitting, a corresponding response to the request; and storing, in one or more computer readable media, one or more associations between the agent request and the responses to the agent request. The responses can each indicate an ability of a corresponding one of the multiple agents to generate responsive content in response to the agent request. The method further includes generating an agent selection model based on the stored associations between the agent requests and their responses. The method further includes, subsequent to generating the agent selection model: receiving subsequent natural language input of a user that is directed to an automated assistant as part of a dialog between the user and the automated assistant; selecting a particular agent based on the subsequent natural language input and the agent selection model, where the particular agent is one of the available agents; and responsive to the receiving the subsequent natural language input and in response to selecting the particular agent: transmitting, via one or more of the application programming interfaces, an invocation request to the selected particular agent. The invocation request invokes the particular agent and causes the particular agent to generate particular responsive content for presentation to the user via one or more user interface output devices. In some implementations, responsive to receiving the subsequent natural language input, the invocation request is transmitted to only the selected particular agent.

These and other implementations of technology disclosed herein may optionally include one or more of the following features.

In some implementations, for a given natural language input instance of the plurality of natural language input instances, a first subset of the responses each indicate an ability to generate responsive content and a second subset of the responses each indicate an inability to generate responsive content. In some of those implementations, the responses of the second subset indicate the inability based on indicating an error or indicating a confidence measure that fails to satisfy a threshold.

In some implementations, the agent selection model is a machine learning model. In some of those implementations, generating the machine learning model includes generating a plurality of training instances based on the agent requests and their responses, and training the machine learning model based on the training instances. Generating each of the training instances can include: generating training instance input of the training instance based on a corresponding agent request of the agent requests; and generating training instance output of the training instance based on the responses stored in association with the corresponding agent request. In some of those implementations, selecting the particular agent based on the subsequent natural language input and the agent selection model includes: applying, as input to the machine learning model, input features that are based on the subsequent natural language input; generating, over the machine learning model based on the input, output that includes a value for the particular agent; and selecting the particular agent based on the value for the particular agent. In some versions of those implementations, selecting the particular agent is further based on one or more contextual values. For example, selecting the particular agent based on the one or more contextual values can include applying the one or more contextual values as additional input to the machine learning model.

In some implementations, the method further includes selecting the plurality of natural language input instances based on determining that the plurality of natural language input instances fail to specify any agent.

In some implementations, the method further includes, for a given natural language input instance of the plurality of natural language input instances: using the responses to the agent request to select a given agent, of the multiple agents of the set; and transmitting a selected invocation request to the selected given agent, where the selected invocation request is based on the given natural language input instance.

In some implementations, the set of multiple agents are selected from the corpus of available agents based on the set of multiple agents each being associated with a value for an intent parameter that is expressed in the natural language input instance.

In some implementations, a method performed by one or more processors is provided and includes, for each of a plurality of natural language input instances generated based on user interface input during human-to-automated assistant dialogs: generating an agent request based on the natural language input instance; selecting, for the agent request, a set of multiple agents from a corpus of available agents; transmitting the agent request to each of the multiple agents of the set; and receiving, from at least a subset of the multiple agents in response to the transmitting, a corresponding response to the request. The method further includes determining, from each of the responses, a relative ability of an agent providing the response to generate responsive content in response to the agent request. The method further includes storing, in one or more computer readable media, an association of the agent request to at least one of the agents determined to be able to respond to the agent request. The method further includes generating an agent selection model based on the stored associations between the agent requests and the agents determined to be able to respond to the agent requests. The method further includes, subsequent to generating the agent selection model: receiving subsequent natural language input of a user that is directed to an automated assistant as part of a dialog between the user and the automated assistant; selecting a particular agent based on the subsequent natural language input and the agent selection model, where the particular agent is one of the available agents; and in response to selecting the particular agent: transmitting an invocation request to the selected particular agent. The invocation request invokes the particular agent and causes the particular agent to generate particular responsive content for presentation to the user via one or more user interface output devices.

These and other implementations of technology disclosed herein may optionally include one or more of the following features.

In some implementations, selecting the particular agent occurs without providing the user with output that explicitly solicits the user to select between the particular agent and one or more other of the available agents.

In some implementations, the agent selection model is a machine learning model. In some of those implementations, generating the machine learning model includes generating a plurality of training instances based on the agent requests and the agents determined to be able to respond to the agent requests; training the machine learning model based on the training instances. Generating each of the training instances can include generating training instance input of the training instance based on a corresponding agent request of the agent requests; and generating training instance output of the training instance based on the at least one of the agents determine to be able to respond to the request. In some of those implementations, selecting the particular agent based on the subsequent natural language input and the agent selection model includes: applying, as input to the machine learning model, input features that are based on the subsequent natural language input; generating, over the machine learning model based on the input, output that includes a value for the particular agent; and selecting the particular agent based on the value for the particular agent.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

In some situations, in order to invoke a particular agent for a particular intent via an automated assistant, a user must provide input that explicitly invokes that particular agent. For example, to invoke an agent named "Hypothetical Agent" for a "restaurant reservation" intent, the user must know to speak an "invocation phrase" for the agent such as "book a restaurant with Hypothetical Agent". Such explicit invocations require the user to know at the outset which agent is most appropriate for an intent, and sends the user directly to that agent for attempted resolution of the intent via interaction with the agent.

However, it may often be the case that the user is unaware of the availability of various agents, and for various automated assistant interfaces it may be impractical and/or undesirable to explicitly provide a list of available agents and associated functionality to a user in the often constrained automated assistant interface. For example, some automated assistant interfaces are "voice only" and it may be impractical and/or undesirable to "read a list" of agents and associated functionality to the user. Moreover, it may even be the case that the automated assistant is unaware of the capabilities of various available agents.

Various implementations disclosed herein enable selection and invocation of an appropriate agent in response to "ambiguous" natural language input of the user—such as natural language input that indicates a desire to engage an agent, but that fails to indicate a particular agent to be engaged.

Figure 1:
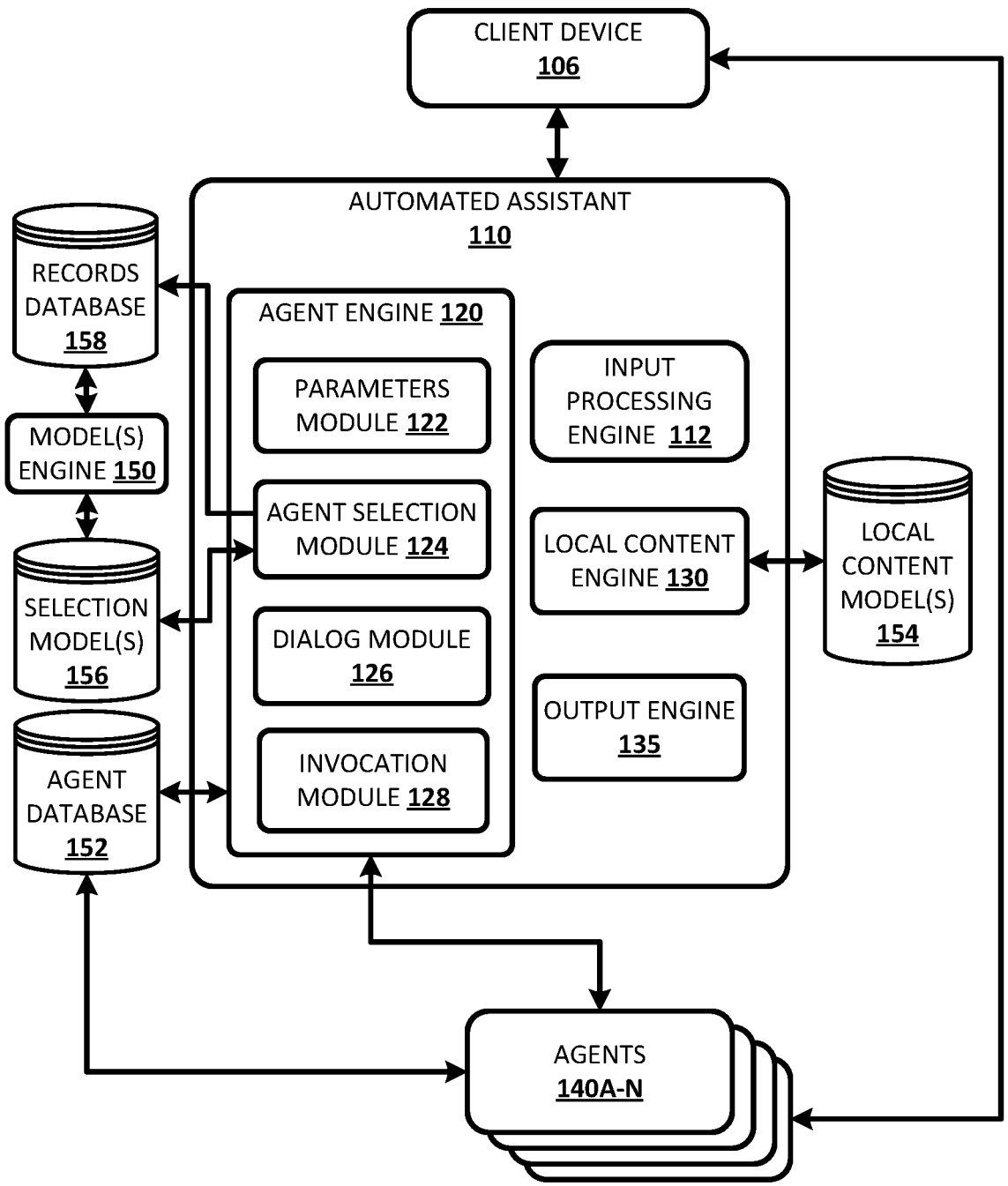
FIG. 1 is a block diagram of an example environment in which implementations disclosed herein may be implemented.

Now turning to FIG. 1, an example environment in which techniques disclosed herein may be implemented is illustrated. The example environment includes a client device 106, an automated assistant 110, and a plurality of agents 140A-N. The client device 106 may be, for example, a standalone voice-activated speaker device, a desktop computing device, a laptop computing device, a tablet computing device, a mobile phone computing device, a computing device of a vehicle of the user, and/or a wearable apparatus of the user that includes a computing device (e.g., a watch of the user having a computing device, glasses of the user having a computing device, a virtual or augmented reality computing device). Additional and/or alternative client devices may be provided.

Although automated assistant 110 is illustrated in FIG. 1 as separate from the client device 106, in some implementations all or aspects of the automated assistant 110 may be implemented by the client device 106. For example, in some implementations input processing engine 112 may be implemented by the client device 106. In implementations where one or more (e.g., all) aspects of automated assistant 110 are implemented by one or more computing devices remote from the client device 106, the client device 106 and those aspects of the automated assistant 110 communicate via one or more networks, such as a wide area network (WAN) (e.g., the Internet).

Although only one client device 106 is illustrated in combination with the automated assistant 110, in many implementations the automated assistant 110 may be remote and may interface with each of a plurality of client devices of multiple users. For example, the automated assistant 110 may manage communications with each of the multiple devices via different sessions and may manage multiple sessions in parallel. For instance, the automated assistant 110 in some implementations may be implemented as a cloud-based service employing a cloud infrastructure, e.g., using a server farm or cluster of high performance computers running software suitable for handling high volumes of requests from multiple users. However, for the sake of simplicity, many examples herein are described with respect to a single client device 106.

The automated assistant 110 is separate from the agents 140A-N and communicates with the agents 140A-N via an API and/or via one or more communications channels (e.g., an internal communications channel of client device 106 and/or a network, such as a WAN). In some implementations, one or more of the agents 140A-N are each managed by a respective party that is separate from a party that manages the automated assistant 110.

One or more of the agents 140A-N may each optionally provide, directly or indirectly, data for storage in agent database 152. However, it may often be the case that certain agents 140A-N do not provide certain data, provide incomplete data, and/or provide inaccurate data. Certain implementations disclosed herein may alleviate these situations through utilization of various additional techniques in selecting appropriate agents for ambiguous user inputs. The provided data for a given agent may define, for example, intent(s) that can be resolved by the given agent. Moreover, the provided data for a given agent may define, for each intent, available values that can be handled by the agent for a plurality of intent slot parameters defined for the intent(s). In some implementations, the automated assistant 110 and/or other component may define the intents, and acceptable values that may be defined for each of the intent slot parameters. For example, such criteria may be defined via an API maintained by the automated assistant 110. One or more of the agents 140A-N may then provide (e.g., transmit over a WAN) its intent(s) and its available values for intent slot parameters to automated assistant 110 and/or other component, which may validate and store the data in agent database 152. Agent database 152 may additionally or alternatively store other features for various agents, such as rankings of agents, popularity measures of agents, etc.

The automated assistant 110 includes an input processing engine 112, a local content engine 130, an agent engine 120, and an output engine 135. In some implementations, one or more of the engines of automated assistant 110 may be omitted, combined, and/or implemented in a component that is separate from automated assistant 110. Moreover, automated assistant 110 may include additional engines not illustrated herein for the sake of simplicity.

The automated assistant 110 receives instances of user input from the client device 106. For example, the automated assistant 110 may receive free-form natural language voice input in the form of a streaming audio recording. The streaming audio recording may be generated by the client device 106 in response to signals received from a microphone of the client device 106 that captures spoken input of a user of the client device 106. As another example, the automated assistant 110 may receive free-form natural language typed input and/or even structured (non-free-form) input in some implementations. In some implementations, user input may be generated by the client device 106 and/or provided to the automated assistant 110 in response to an explicit invocation of the automated assistant 110 by a user of the client device 106. For example, the invocation may be detection by the client device 106 of certain voice input of the user (e.g., an automated assistant 110 hot word/phrase such as "Hey Assistant"), user interaction with a hardware button and/or virtual button (e.g., a tap of a hardware button, a selection of a graphical interface element displayed by the client device 106), and/or other particular user interface input.

The automated assistant 110 provides an instance of output in response to receiving an instance of user input from the client device 106. The instance of output may be, for example, audio to be audibly presented by the device 106 (e.g., output via a speaker of the client device 106), text and/or graphical content to be graphically presented by the device 106 (e.g., rendered via a display of the client device 106), etc. As described herein, some instances of the output may be based on local responsive content generated by the automated assistant 110, while other instances of the output may be based on responsive content generated by a selected one of the agents 140A-N.

The input processing engine 112 of automated assistant 110 processes natural language input and/or other user input received via client devices 106 and generates annotated output for use by one or more other components of the automated assistant 110, such as local content engine 130 and/or agent engine 120. For example, the input processing engine 112 may process natural language free-form input that is generated by a user via one or more user interface input devices of client device 106. The generated annotated output includes one or more annotations of the natural language input and optionally one or more (e.g., all) of the terms of the natural language input. As another example, the input processing engine 112 may additionally or alternatively include a voice to text module that receives an instance of voice input (e.g., in the form of digital audio data), and converts the voice input into text that includes one or more text words or phrases. In some implementations, the voice to text module is a streaming voice to text engine. The voice to text module may rely on one or more stored voice to text models (also referred to as language models) that each may model a relationship between an audio signal and phonetic units in a language, along with word sequences in the language.

In some implementations, the input processing engine 112 is configured to identify and annotate various types of grammatical information in natural language input. For example, the input processing engine 112 may include a part of speech tagger configured to annotate terms with their grammatical roles. For example, the part of speech tagger may tag each term with its part of speech such as "noun," "verb," "adjective," "pronoun," etc. Also, for example, in some implementations the input processing engine 112 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the input processing engine 112 may additionally and/or alternatively include an entity tagger configured to annotate entity references in one or more segments such as references to people, organizations, locations, and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity to resolve a particular entity.

In some implementations, the input processing engine 112 may additionally and/or alternatively include a coreference resolver configured to group, or "cluster," references to the same entity based on one or more contextual cues. For example, the coreference resolver may be utilized to resolve the term "it" in an instance of user input to a preceding mention of "Restaurant A" in an immediately preceding instance of user input.

In some implementations, one or more components of the input processing engine 112 may rely on annotations from one or more other components of the input processing engine 112. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the input processing engine 112 may use related prior input and/or other related data outside of the particular natural language input to determine one or more annotations.

The input processing engine 112 may attempt to discern the semantics or meaning of user input and provide semantic indications of the user input to local content engine 130 and/or agent engine 120 for use by those engines. The input processing engine 112 may rely on one or more stored grammar models to map text (or other input) to particular actions and to identify attributes that constrain the performance of such actions, e.g., input variables to such actions.

The local content engine 130 may generate a response to received user input when that user input is associated with a "local action" (as opposed to an agent action). In some implementations, the input processing engine 112 determines whether the user input is associated with a local action or an agent action. The local content engine 130 may work in conjunction with the input processing engine 112 and perform one or more actions as dictated by parsed text (e.g., action(s) and action parameter(s)) provided by the input processing engine 112. For local intents, the local content engine 130 may generate local responsive content and provide that local responsive content to the output engine 135 for providing corresponding output for presentation to a user via the device 106. The local content engine 130 may utilize one or more stored local content models 154 for generating local content and/or performing other actions. The local content models 154 may, for example, incorporate various rules for creating local responsive content. In some implementations, the local content engine 130 may communicate with one or more other "local" components in generating local responsive content, such as a local dialog module (which may be the same as, or similar to, dialog module 126).

The output engine 135 provides instances of output to the client device 106. An instance of output may be based on local responsive content (from local content engine 130) and/or responsive content from one of the agents 140A-N (when the automated assistant 110 acts as an intermediary). In some implementations, the output engine 135 may include a text to speech engine that converts textual components of responsive content to an audio format, and the output provided by the output engine 135 is in an audio format (e.g., as streaming audio). In some implementations, the responsive content may already be in an audio format. In some implementations, the output engine 135 additionally or alternatively provides textual reply content as output (optionally for conversion by the device 106 to audio) and/or provides other graphical content as output for graphical display by the client device 106.

The agent engine 120 includes parameters module 122, an agent selection module 124, a dialog module 126, and an invocation module 128. In some implementations, module(s) of agent engine 120 may be omitted, combined, and/or implemented in a component that is separate from the agent engine 120. Moreover, agent engine 120 may include additional modules not illustrated herein for the sake of simplicity.

The parameters module 122 determines value(s) for parameter(s) such as an intent parameter, intent slot parameter(s), contextual parameter(s), etc. The parameters module 122 determines the values based on input provided by the user in a dialog with the automated assistant 110 and optionally based on client device context. The value for an intent parameter indicates the intent indicated by user provided input in the dialog and/or indicated by other data. For example, the value for an intent of a dialog can be one of multiple available intents such as one of "booking", "booking a restaurant reservation", "booking a hotel", "purchasing professional services", "telling jokes", "reminder", "purchasing travel services", and/or other intents. The parameters module 122 can determine the intent based on the most recent natural language input provided to the automated assistant in the dialog and/or past natural language input provided in the dialog.

The value(s) for intent slot parameter(s) indicate value(s) for more granular parameters of the intent. For example, a "booking restaurant reservation" intent may have intent slot parameters for "number of people", "date", "time", "cuisine type", "particular restaurant", "restaurant area", etc. The parameters module 122 can determine value(s) for intent slot parameter(s) based on user provided input in the dialog and/or based on other considerations (e.g., user set preferences, past user interactions). For example, value(s) for one or more intent slot parameter(s) for a "booking restaurant reservation intent" can be based on the most recent natural language input provided to the automated assistant in the dialog and/or past natural language input provided in the dialog. For instance, natural language input of "book me a restaurant for tonight at 6:30" can be used by the parameters module 122 to determine a value of "today's date" for the "date" intent slot parameter and a value of "18:30" for the "time" intent slot parameter. It is understood that for many dialogs, the parameters module 122 may not resolve values for all (or even any) of the intent slot parameters of an intent. Such values may be resolved (if at all) by an agent that is invoked to satisfy the intent.

The values for contextual parameters can include, for example, client device contextual values such as values(s) based on: historical interactions of a user of the client device, currently rendered and/or recently rendered content on the client device, a location of the client device, current date and/or time, etc.

The dialog module 126 can utilize one or more grammar models, rules, and/or annotations from input processing engine 112 in interacting with a user via the client device 106 to select a particular agent. The parameters module 122 and/or agent selection module 124 can optionally interact with the dialog module 126 to generate prompt(s) to solicit further user input related to selecting a particular agent. Any prompt(s) generated by the dialog module 126 may be provided for presentation to the user by the output engine 135 and further responsive user input received. The further user input(s) may each be analyzed by the parameters module 122 (optionally as annotated by input processing engine 112) and/or the agent selection module 124 to assist in selection of a particular agent. As one example, three candidate agents may be initially selected by the agent selection module 124 as potential agents according to techniques described herein, and the dialog module 126 may present one or more prompts to the user that solicit the user make a selection of a particular one of the three candidate agents. The agent selection module 124 can then select the particular agent based on the user selection.

The agent selection module 124 utilizes value(s) determined by the parameters module 122 to select, from agents 140A-N, a particular agent to invoke. The agent selection module 124 may additionally or alternatively utilize other criteria in selecting the particular agent. For example, the agent selection module 124 may utilize one or more selection models of selection model(s) database 156 and/or use agent database 152 in selecting the particular agent.

Figure 2:
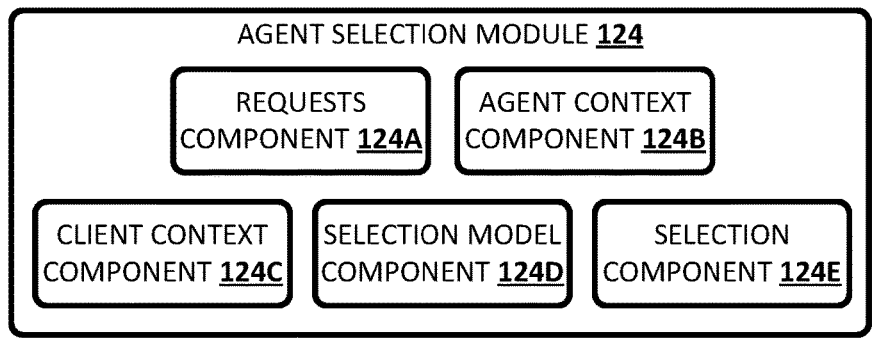
FIG. 2 is an example of various components that may be included in an agent selection module of FIG. 1.

Referring to FIG. 2, an example is illustrated of various components 124A-E that may be included in agent selection module 124.

Requests component 124A can transmit "live" agent requests to one or more of the agents 140A-N and utilize response(s) (and/or lack of response(s)) from those agents to determine an ability of each of the agents to generate responsive content in response to the agent requests. For example, the requests component 124A can transmit a live agent request to those agents 140A-N that are associated (e.g., in agent database 152) with an intent that conforms to a value for an intent parameter determined by parameters module 122. As described herein, an agent request can be based on values for parameters determined by parameters module 122. An agent request can be similar to (or the same as) an invocation request, but does not result in immediate invocation of any agent. A response (or lack of response)

from an agent in response to an agent request can directly or indirectly indicate the ability of that agent to generate responsive content in response to the agent request.

Agent context component 124B determines feature(s) for one or more of the agents 140A-N, such as those agents 140A-N that are associated (e.g., in agent database 152) with an intent that conforms to a value for an intent parameter determined by parameters module 122. The agent context component 124B can determine the feature(s) from agent database 152. The feature(s) for an agent can include, for example a stored ranking of the particular agent (e.g., a ranking by a population of users), a popularity of the particular agent in general, a popularity of the particular agent for the intent determined by parameters module 122, etc.

Client context component 124C determines feature(s) associated with the user of the client device 106 (and/or the client device 106 itself) such as features based on historical interactions of a user of the client device with the automated assistant 110. For example, the feature(s) can include features based on: how often each of various agents are utilized by the user; how recently each of various agents was utilized by the user; currently rendered and/or recently rendered content on the client device (e.g., entities present in rendered content, recently utilized application(s)), a location of the client device, a current date and/or time, etc.

Selection model component 124D utilizes one or more selection models of selection model(s) database 156 to determine one or more of the agents 140A-N that may be appropriate for invocation. For example, the selection model component 124D can utilize selection model(s) to determine, for each of a plurality of agents 140A-N, one or more probabilities or other measure(s) that indicate the appropriateness of invoking the agent. The selection model component 124D can apply, to each of the selection models, one or more of the parameter values determined by the parameters module 122 and/or value(s) determined by component(s) 124A, 124B, and/or 124C.

The selection component 124E utilizes output provided by components 124A, 124B, 124C, and/or 124D in selecting one or more agents 140A-N. In some implementations and/or situations, the selection component 124E selects only a single one of the agents 140A-N without prompting the user to choose between multiple agents. In some other implementations and/or situations, the selection component 124E may select a subset of the agents 140A-N—and provide a prompt to the user (e.g., via a prompt generated by the dialog module 126 in the dialog) that solicits the user to provide user interface input to select one of the agents of the subset. The selection component 124E can provide an indication of the selected agent to the invocation module 128.

The invocation module 128 transmits, to the agent (of agents 140A-N) selected by agent selection module 124, an invocation request that includes parameters determined by the parameters module 122. The transmitted invocation request invokes the particular agent. As described herein, in some situations the automated assistant 110 may still serve as an intermediary when the particular agent is invoked. For example, in serving as an intermediary where natural language input of a user is voice input: the input processing engine 112 of the automated assistant 110 may convert that voice input to text; the automated assistant 110 may transmit the text (and optionally annotations of the text from input processing engine 112) to the particular agent, and receive responsive content from the particular agent; and the output engine 135 may provide output that is based on the responsive content for presentation to the user via the client device 106. Also, for example, in serving as an intermediary, the automated assistant 110 may additionally or alternatively analyze user input and/or responsive content to determine if dialog with the agent should be terminated, transferred to an alternate agent, etc. As also described herein, in some situations the dialog may be actually transferred to the agent (without the automated assistant 110 serving as an intermediary once transferred), and transferred back to the automated assistant 110 upon occurrence of one or more conditions. Further, as also described herein, in some situations an invoked agent can be executed by the client device 106 and/or brought to the forefront by the client device 106 (e.g., its content can take over a display of the client device 106).

Each of the agents 140A-N may include a contextual parameters engine, a content engine, and/or other engines. Moreover, in many implementations an agent may access various stored models and/or other resources (e.g., its own grammar model(s) and/or content model(s)) in generating responsive content.

Also illustrated in FIG. 1 is a model(s) engine 150 and a records database 158. As described in more detail herein, the records database 158 may include stored information based on various automated assistant 110 interactions with agents 140A-N. The model(s) engine 150 can utilize such information in generating one or more selection models of selection model(s) database 156. Additional description is provided herein.

Turning now to FIGS. 3-10, additional description of various components of the environment of FIG. 1 are described.

Figure 3:
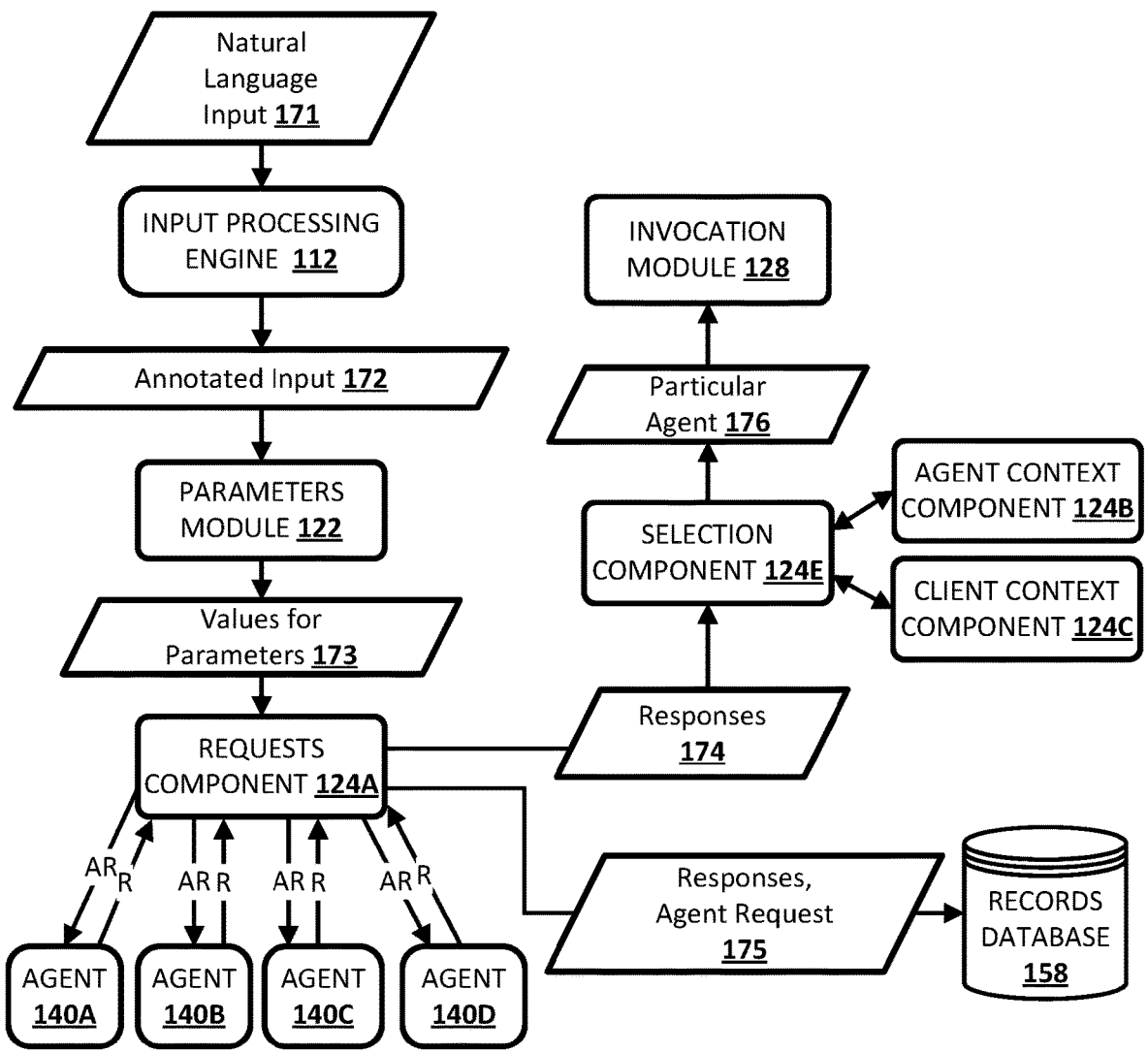
FIG. 3 illustrates an example of how an agent request and response(s) can be utilized in selecting a particular agent and/or stored in a records database for use in generating agent selection model(s).

FIG. 3 provides an example of how an agent request and response(s) can be utilized in selecting a particular agent and/or stored in records database 158 for use in generating agent selection model(s).

In FIG. 3, natural language input 171 is received by the input processing engine 112 of the automated assistant 110. As a working example, the natural language input 171 may be "table for 4, outdoor seating, Restaurant A". The input processing engine 112 generates annotated input 172 and provides the annotated input 172 to the parameters module 122.

The parameters module 122 generates values for parameters 173 based on the annotated input 172 and/or based on client device context. Continuing with the working example, the parameters module 122 can generate a "restaurant booking" value for an intent parameter, an "outdoor" value for a seating preference intent slot parameter, and a "Restaurant A" value for a restaurant location intent slot parameter.

The requests component 124A generates an agent request based on the values for parameters 173. As indicated by the "AR" directed arrows of FIG. 3, the requests component 124A transmits the agent request to each of multiple agents 140A-D. In some implementations, the requests component 124A can select agents 140A-D based on determining that they are associated with a "restaurant booking" intent. In some other implementations, the requests component 124A can send the agent requests to agents 140A-D and/or additional agents (e.g., it can be sent to all of agents 140A-N) without regard to intent. For example, the intent(s) that can be handled by various agents may be unknown and/or the intent may not be derivable from the dialog.

As indicated by the "R" directed arrows of FIG. 3, the requests component 124A receives responses from each of the agents 140A-D in response to transmitting the agent request to the agents 140A-D. The responses each indicate an ability of a corresponding one of the agents 140A-D to resolve the agent request. For example, the response from a given agent can be a binary indication, a non-binary confidence measure, actual responsive content (or no content/an error), etc. Although responses from each of the agents is illustrated in FIG. 3, in some implementations or situations one or more of the agents 140A-D may not respond—which may indicate the corresponding agent is unable to respond (e.g., an agent can't process the agent request and/or is offline). The agent request is transmitted to the agents 140A-D without active invocation of the agents 140A-D.

The requests component 124A stores, in records database 158, the responses (and/or determination(s) made based on the responses) and the agent request. For example, the requests component 124A can store the agent request and an indication of the response for each of the agents 140A-D. For instance, the requests component 124A can store the agent request and indications that agent 140A was unable to respond, agent 1406 was able to respond, agent 140C was unable to respond, etc.

The requests component 124A also provides the responses 174 (and/or determination(s) made based on the responses) to the selection component 124E.

The selection component 124E utilizes the responses 174 to select a particular agent 176, and may optionally additionally utilize features provided by agent context component 124B and/or client context component 124C. As one example, the selection component 124E may select the particular agent 176 based on only the responses 174 (e.g., select the agent with the response most indicative of ability to respond). As another example, the selection component 124E may utilize the responses 174 and a ranking of one or more of the agents 140A-D that is provided by agent context component 124B. For instance, the selection component 124E may initially select two of the agents 140A-D whose responses are most indicative of ability to respond, then select only one of those based on the selected one having a higher ranking than the non-selected one. As yet another example, the selection component 124E may utilize the responses 174 and historical usage features provided by the client context component 124C. For instance, the selection component 124E may initially select two of the agents 140A-D whose responses are most indicative of ability to respond, then select only one of those based on the selected one being utilized more frequently and/or more recently by a user interacting with the automated assistant 110.

The selection component 124E provides the particular agent 176 to the invocation module 128. The invocation module 128 can invoke the particular agent. For example, the invocation module 128 can invoke the particular agent by transmitting, to the particular agent, an invocation request that is based on the values for parameters 173. Also, for example, the invocation module 128 can cause the output engine 135 to provide output that is based on already received responsive content from the particular agent—and may optionally invoke the particular agent for generating further responsive content in response to further received user interface input (if any) that is received in response to providing the output.

Figure 4:
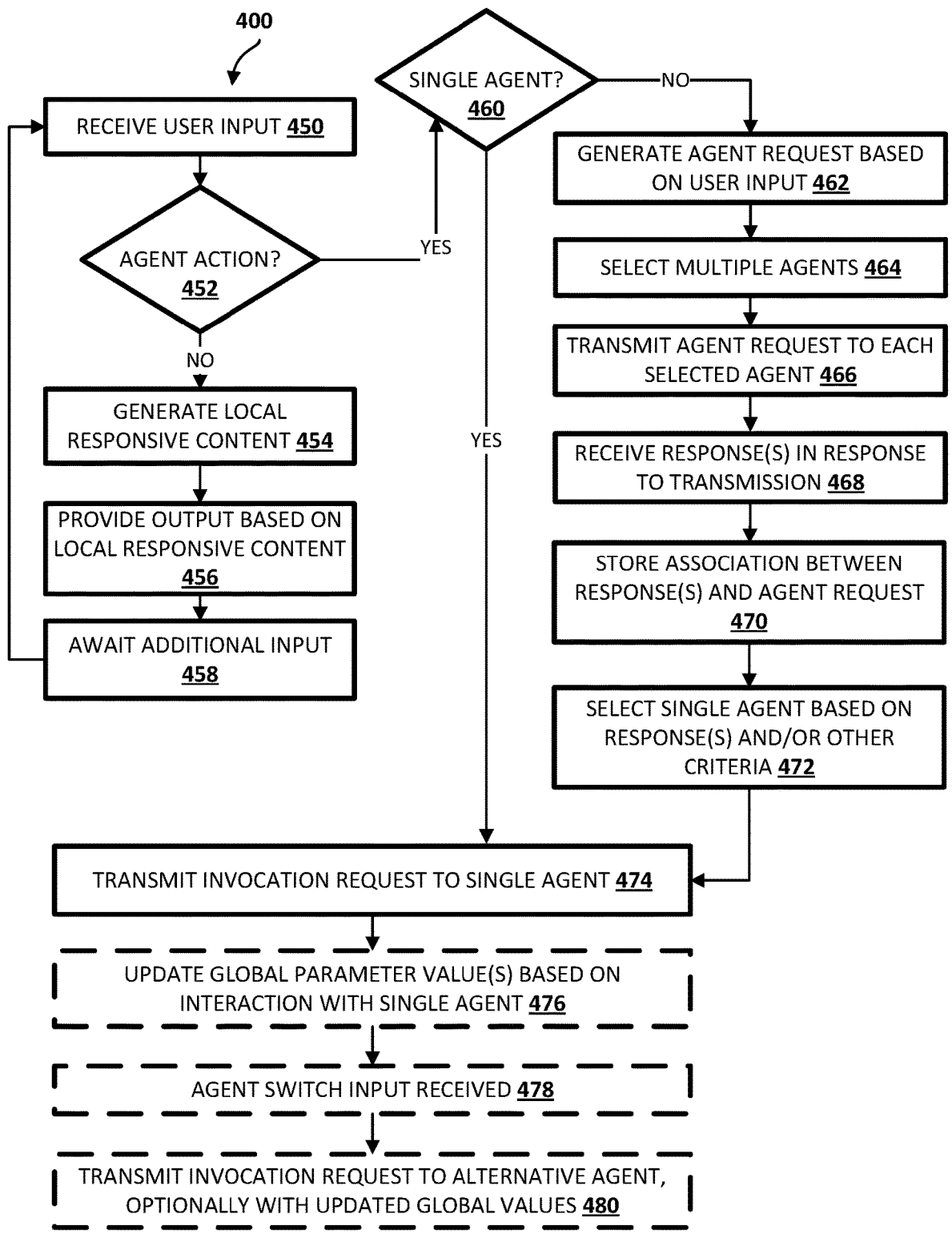
FIG. 4 is a flowchart illustrating an example method of selecting a single agent to invoke according to implementations disclosed herein.

FIG. 4 is a flowchart illustrating an example method 400 according to implementations disclosed herein. For convenience, the operations of the flow chart of FIG. 4 are described with reference to a system that performs the operations. This system may include various components of various computer systems, such as one or more components of automated assistant 110. Moreover, while operations of method 400 are shown in a particular order, this is not meant to be limiting. One or more operations may be reordered, omitted or added.

At block 450, the system receives user input. In some implementations, the user input received at block 450 is natural language input that is free-form.

At block 452, the system determines whether the received user input indicates an agent action. For example, the system may parse text of received natural language input (or text converted from received audio natural language input), and determine whether the parsed text maps to any agent action. For instance, the system may determine whether the parsed text maps to any agent action based on whether terms/phrases included in the text match terms/phrases stored in association with an agent action. Also, for instance, the system may determine whether one or more entities derived from the text match one or more entities stored in association with an agent action. As yet another instance, the system may assume the input maps to an agent action if the system determines it is unable to generate local responsive content in response to the input. It is noted that, in some implementations, the system may determine the input maps to an agent action even when the system is able to generate local responsive content in response to the input. For example, the system may determine that it is able to generate local responsive content and that one or more agents could also potentially generate agent responsive content. In some of those examples, the system can include local agent(s) among the agents to be considered in blocks 462, 464, 466, and 468 (described below).

If the system determines at block 452 that an agent intended action is not indicated, the system proceeds to blocks 454, 456, and 458. At block 454, the system generates local responsive content without invocation of an agent. For example, the system may generate the local responsive content utilizing local grammar models and/or local content models of the system. At block 456, the system provides output that is based on the local responsive content. For example, the output may be the local responsive content or a conversion (e.g., a text to speech conversion) of the local responsive content. The output is provided for presentation (e.g., audible or graphical) via the client device. At block 458, the system awaits additional voice input and proceeds back to block 450 upon receiving additional voice input.

If the system determines at an iteration of block 452 that an agent action is indicated, the system proceeds to block 460. At block 460, the system determines whether a single agent is specified in the user input of block 450 and/or a single agent can be otherwise unambiguously resolved.

If the system determines at block 460 that a single agent is indicated, the system proceeds to block 474.

If the system determines at block 460 that a single agent is not indicated, the system proceeds to blocks 462, 464, 466, and 468. At block 462, the system generates an agent request based on the user input in a most recent iteration of block 450 and/or based on prior user input and/or other criteria. At block 464, the system selects multiple agents from a corpus of available agents. For example, the system may select all of the agents of the corpus, or a subset of the agents (e.g., those having an intent indicated by the agent request). The agents may include only non-local agents and/or local and non-local agents. At block 466, the system transmits the agent request of block 462 to each of the agents selected in block 464.

At block 468, the system receives one or more responses from the agents in response to the transmission of block 466. At block 470, the system stores an association between the responses received at block 468 (or a determination made based on the responses), and the agent request transmitted at block 466. Such stored association may be used (e.g., in method 500 of FIG. 5) in generating an agent selection model. At block 472, the system selects a single agent based on the responses received at block 468 and/or based on other criteria.

In some implementations, at block 472 the system uses the responses received at block 468 to select a subset of the agents, provides indications of the agents of the subset as output for presentation to the user, and utilizes a user selection in response to the output to select the single agent from the agents of the subset. In some version of those implementations, the system may also store, at block 470, an indication of the single agent selected by the user. The indications of the agents can be, for example, name(s) or other identifiers of the agents and/or indications of responsive content of the agents included in the responses received at block 468.

At block 474, the system transmits an invocation request to the single agent. The single agent can be the one selected at block 472 (where the determination at block 460 was "no"), or the single agent indicated in the user input (where the determination at block 460 was "yes"). For example, the system may transmit the invocation request over one or more communications channels and may optionally utilize an API. In some implementations, the invocation request includes value(s) for various invocation parameter(s) as described herein. In some implementations, the system may, prior to proceeding to block 474 from block 472, first prompt the user to confirm that the user desires to utilize the single agent. In those implementations, the system may require affirmative user input in response to the prompt prior to proceeding to block 474 from block 472. In other implementations, the system may automatically proceed from block 472 to block 474 without first prompting the user to confirm.

At optional block 476, the system may update global parameter value(s) based on interaction of the user with the single agent. For example, further natural language input provided by the user to the single agent may result in the single agent defining a value for a previously undefined global parameter (e.g., a specific intent slot parameter)—or may result in the single agent modifying a previously defined value for a parameter. The single agent may provide such updated value(s) to the system and the system may update global parameter value(s) to reflect the updated value(s).

At block 478, the system receives agent switch input. Agent switch input is input from the user (e.g., natural language input) that indicates a desire to switch to a different agent. For example, inputs such as "talk to another agent", "different agent", "try it with Agent X", etc. can be agent switch inputs.

In response to receiving the agent switch input, at block 480 the system transmits an invocation request to an alternative agent. The invocation request to the alternative agent invokes the alternative agent in lieu of the single agent invoked in block 474. The invocation request can optionally include the updated global parameter value(s) updated at block 476. In this manner, values derived through interaction with a first agent can be transferred to a subsequently invoked agent, thereby increasing the efficiency of interactions with the subsequently invoked agent. In some situations, which alternative agent is selected for transmitting the additional invocation request to may be based on the agent switch input itself (e.g., if it references one of the alternative agent by name or characteristic) and/or based on other factors (e.g., agent requests may again be sent based on the updated global parameter value(s), and the response(s) utilized to select an alternative agent). In some implementations, before transmitting the invocation request to the alternative agent at block 480, the system may check to ensure the alternative agent is likely able to generate responsive content. For example, the system can send an agent request to the alternative agent and make such a determination based on a response, and/or make such a determination based on information for the agent in agent database 152.

Figure 5:
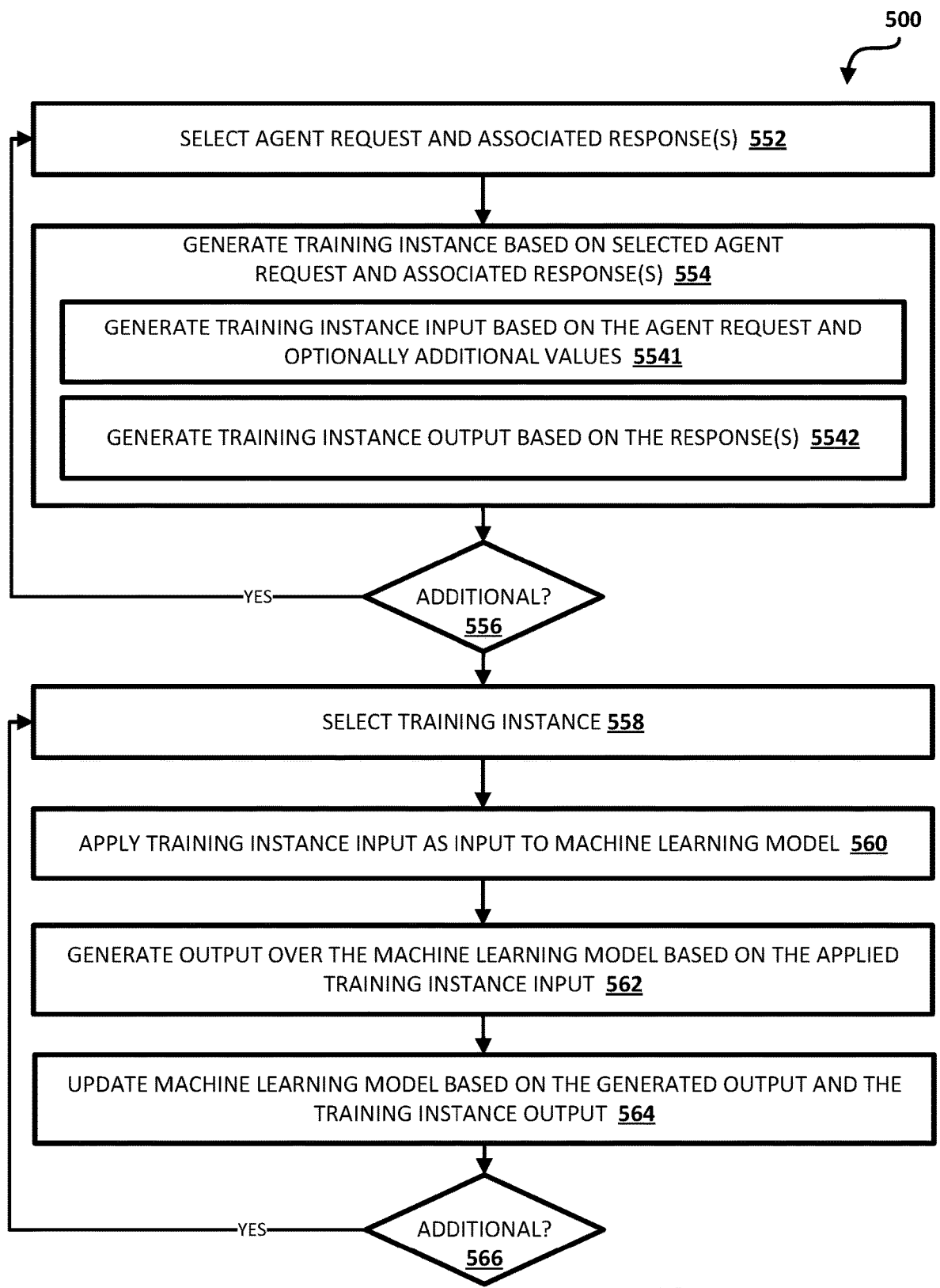
FIG. 5 is a flowchart illustrating an example method of generating an agent selection model according to implementations disclosed herein.

FIG. 5 is a flowchart illustrating another example method 500 according to implementations disclosed herein. FIG. 5 illustrates an example of generating a selection model, of selection model(s) database 156, based on agent requests and associated responses. In the example of FIG. 5, the selection model is a machine learning model, such as a deep neural network model.

For convenience, the operations of the flow chart of FIG. 5 are described with reference to a system that performs the operations. This system may include various components of various computer systems, such as model(s) engine 150. Moreover, while operations of method 500 are shown in a particular order, this is not meant to be limiting. One or more operations may be reordered, omitted or added.

At block 552, the system selects an agent request and associated responses. As one example, the agent request and associated responses may be selected from records database 158. In some implementations, the selected agent request and associated responses may have been generated by requests component 124A as illustrated in FIG. 3 and/or may have been stored in an iteration of block 470 of method 400 of FIG. 4. In some other implementations, agent requests and/or associated responses generated through other techniques may be utilized. For example, agent requests may be transmitted to agents, and responses received in a "non-live" manner. In other words, the agent requests and the responses need not necessarily be those that were generated in actively selecting a particular agent during a past human-to-automated assistant dialog. As one non-limiting instance, agent requests can include those that are based on natural language inputs provided to agents immediately after invocations that are "bare" invocations. For instance, a natural language input provided to "Agent A" immediately after a bare invocation of "Agent A" can be utilized to generate an agent request that is thereafter transmitted to multiple additional agents.

As a working example, assume an agent request selected at an iteration of block 552 includes a "restaurant booking" value for an intent parameter, an "outdoor" value for a seating preference intent slot parameter, and a "Restaurant A" value for a restaurant location intent slot parameter. Further assume the selected associated responses include binary responses of "yes" (can generate responsive content) or "no" (cannot generate responsive content) to the agent request. In particular, that the associated responses indicate that Agents 1-5 generated responses of "yes" and Agents 6-200 generated responses of "no".

At block 554, the system generates a training instance based on the selected agent request and the associated response(s). Block 554 includes sub-blocks 5541 and 5542.

At sub-block 5541, the system generates training instance input of the training instance based on the agent request and optionally based on additional values. Continuing with the working example, the system can generate training instance input that includes the values of the agent request for: the intent parameter, the seating preference intent slot parameter, and the restaurant location intent slot parameter. The system can include a "null" value (or other value(s)) in the training instance for dimensions of the training instance input that are undefined by the agent request. For example, if the input dimensions of the machine learning model to be trained include inputs for other intent slot parameter(s) (of the same intent and/or other intents), null values can be utilized in the training instance for such inputs.

At sub-block 5542, the system generates training instance output of the training instance based on the response(s). Continuing with the working example, the system can generate training instance output that includes a "1" (or other "positive value") for each of the output dimensions corresponding to Agents 1-5 (that generated responses of "yes") and a "0" (or other "negative" value) for each of the output dimensions that correspond to Agents 6-200 (that generated responses of "no").

At block 556, the system determines whether there are additional agent requests and associated responses. If so, the system proceeds back to block 552 and selects another agent request and associated responses, then generates another training instance based on the selected agent request and associated responses.

Blocks 558-566 may be performed following, or in parallel with, multiple iterations of blocks 552, 554, and 556.

At block 558, the system selects a training instance generated in an iteration of block 554.

At block 560, the system applies the training instance as input to a machine learning model. For example, the machine learning model can have input dimensions that correspond to the dimensions of the training instance input generated at block 5541.

At block 562, the system generates output over the machine learning model based on the applied training instance input. For example, the machine learning model can have output dimensions that correspond to the dimensions of the training instance output generated at block 5541 (e.g., each dimension of the output can correspond to an agent and/or an agent and intent).

At block 564, the system updates the machine learning model based on the generated output and the training instance output. For example, the system can determine an error based on the output generated at block 562 and the training instance output, and backpropagate the error over the machine learning model.

At block 566, the system determines whether there are one or more additional unprocessed training instances. If so, the system proceeds back to block 558, selects an additional training instance, then performs blocks 560, 562, and 564 based on the additional unprocessed training instance. In some implementations, at block 566 the system may determine not to process any additional unprocessed training instances if one or more training criteria have been satisfied (e.g., a threshold number of epochs have occurred and/or a threshold duration of training has occurred). Although method 500 is described with respect to a non-batch learning technique, batch learning may additionally and/or alternatively be utilized.

A machine learning model trained according to method 500 can thereafter be utilized to predict, based on a current dialog, a probability for each of a plurality of available agents (and optionally intents)—where each of the probabilities indicates a probability that the agent is capable of appropriately handling an invocation request that is based on the dialog. For example, values based on a current dialog can be applied as input to the trained machine learning model to generate output over the model—where the output includes a plurality of values that each correspond to an agent and the values each indicate a probability (e.g., values from 0 to 1) that the corresponding agent is able to generate appropriate responsive content if invoked. For example, if 200 available agents are represented by the model, 200 values may be included in the output, with each value corresponding to one of the agents and indicating a probability that the agent is able to generate appropriate responsive content. In this manner, the trained machine learning model effectively provides insight into the capabilities of various agents through training based on responses of those agents to various real world agent requests. The trained machine learning model can be used to determine, based on input, the abilities of various agents to generate a response to the input—even when agent database 152 and/or other resources don't explicitly indicate those agent's abilities for the input.

FIG. 5 illustrates one example of an agent selection model that can be generated and utilized. However, as described herein, additional and/or alternative agent selection models can be utilized in selecting a particular agent. Such additional and/or alternative agent selections models may optionally be machine learning models trained based on training instances that vary from those described with respect to FIG. 5.

As one example, a selection model can be generated based on past explicit selections of agents by various users and such a selection model may additionally or alternatively be utilized in selecting a particular agent. For instance, as described with respect to block 472 of FIG. 4, in some implementations indications of multiple agents may be presented to a user and a user selection of a single agent of the multiple agents can be utilized to select the single agent from the multiple agents. Such explicit selections of multiple users can be utilized to generate a selection model. For example, training instances can be generated that are similar to those described above with respect to method 500, but the training instance output of each training instance can be generated based on the agent selected by the user. For instance, for a training instance a "1" (or other "positive value") can be utilized for the output dimension corresponding to the selected agent and a "0" (or other "negative" value) can be utilized for each of the output dimensions that correspond to all other agents. Also, for instance, for a training instance a "1" (or other "positive value") can be utilized for the output dimension corresponding to the selected agent, a "0.5" (or other "intermediate value") can be utilized for the output dimension(s) corresponding to the other agent(s) presented to the user but not selected, and a "0" (or other "negative" value) can be utilized for each of the output dimensions that correspond to all other agents. In this and other manners, explicit selections of agents by users can be leveraged in generating one or more agent selection models.

Figure 6:
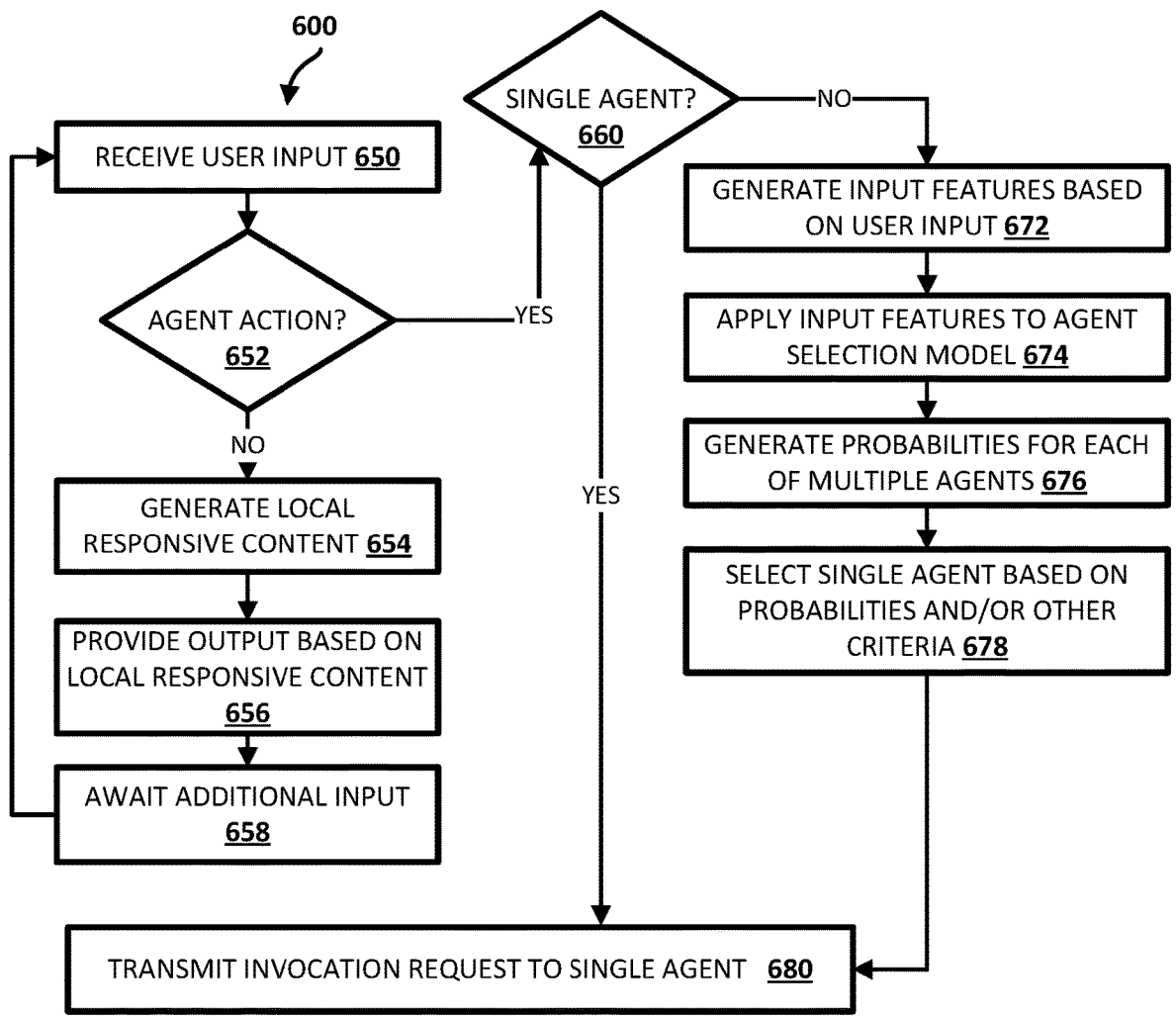
FIG. 6 is a flowchart illustrating another example method of selecting a single agent to invoke according to implementations disclosed herein.

FIG. 6 is a flowchart illustrating another example method 600 according to implementations disclosed herein. FIG. 6 illustrates an example of utilizing an agent selection model, such as an agent selection model generated based on method 500 of FIG. 5, in selecting a single agent to invoke.

For convenience, the operations of the flow chart of FIG. 6 are described with reference to a system that performs the operations. This system may include various components of various computer systems, such as one or more components of automated assistant 110. Moreover, while operations of method 600 are shown in a particular order, this is not meant to be limiting. One or more operations may be reordered, omitted or added.

At block 650, the system receives user input. Block 650 may share one or more aspects in common with block 450 of FIG. 4.

At block 652, the system determines whether the received user input indicates an agent action. Block 652 may share one or more aspects in common with block 452 of FIG. 4.

If the system determines at block 652 that an agent intended action is not indicated, the system proceeds to blocks 654, 656, and 658. At block 654 the system generates local responsive content without invocation of an agent. At block 656, the system provides output that is based on the local responsive content. At block 658, the system awaits additional voice input and proceeds back to block 650 upon receiving additional voice input. Blocks 654, 656, and 658 may share one or more aspects in common with blocks 454, 456, and 458 of FIG. 4.

If the system determines at an iteration of block 652 that an agent action is indicated, the system proceeds to block 660. At block 660, the system determines whether a single agent is specified in the user input 650 and/or a single agent can be otherwise unambiguously resolved. Block 660 may share one or more aspects with block 460 of FIG. 4.

If the system determines at block 660 that a single agent is indicated, the system proceeds to block 680.

If the system determines at block 660 that a single agent is not indicated, the system proceeds to blocks 672, 674, 676, and 678. At block 672, the system generates input features based on the user input in a most recent iteration of 650 and/or based on prior user input and/or other criteria. For example, the system can generate input features that include value(s) for parameter(s) determined based on the user input, such as value(s) for an intent parameter, intent slot parameter(s), etc. Also, for example, the system can generate values based on current client device context.

At block 674, the system applies the input features to an agent selection model.

At block 676, the system generates, based on the application of the input to the agent selection model, probabilities for each of multiple agents. Each of the probabilities indicate an ability of a corresponding agent to generate appropriate responsive content.

At block 678, the system selects the single agent based on the probabilities and/or other criteria. In some implementations, the system selects the single agent based on it having the highest probability to generate appropriate responsive content. In some other implementations, the system selects the single agent based on additional criteria. For example, the system can select an initial subset of agents based on the probabilities, transmit "live" agent requests to the agents of the subset, and utilize "live" responses to the agent requests in selecting the single agent. As another example, the system can additionally or alternatively select the single agent based on historical interactions of a user of the client device (e.g., how often the single agent is utilized by the user, how recently the single agent was utilized by the user), currently rendered and/or recently rendered content on the client device, a location of the client device, current date and/or time, a ranking of the single agent (e.g., a ranking by a population of users), a popularity of the single agent (e.g., popularity among a population of users), etc.

At block 680, the system transmits an invocation request to the single agent. The single agent can be the one selected at block 678 (where the determination at block 660 was "no"), or the single agent indicated in the user input (where the determination at block 660 was "yes"). Block 680 may share one or more aspects in common with block 474 of FIG. 4.

Figure 7:
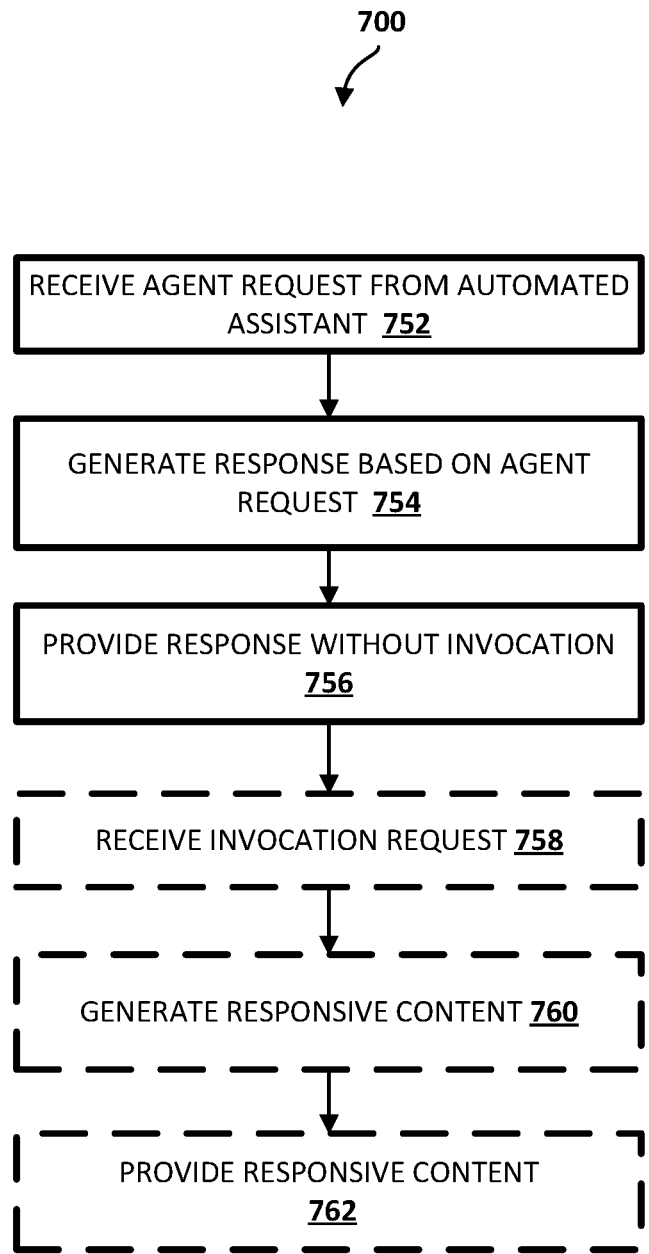
FIG. 7 is a flowchart illustrating an example method that may be performed by an agent according to implementations disclosed herein.

FIG. 7 is a flowchart illustrating another example method 700 according to implementations disclosed herein. FIG. 7 illustrates an example of a method that may be performed by one or more of the agent selection models.

For convenience, the operations of the flow chart of FIG. 7 are described with reference to a system that performs the operations. This system may include various components of various computer systems, such as one or more components of one of the agents 140A-N. Moreover, while operations of method 700 are shown in a particular order, this is not meant to be limiting. One or more operations may be reordered, omitted or added.

At block 752, the system receives an agent request from an automated assistant. In some implementations, the agent request is flagged or otherwise indicated as an agent request.

At block 754, the system generates a response based on the agent request. For example, the system may parse the contents of the agent request, determine if the system is able to respond to the request, and generate the response based on whether it is able to respond to the request. For example, the request may include a value for an intent parameter and the system may determine whether it can respond to the request based on whether it can respond to an intent indicated by the value. For instance, if the value for the intent parameter is "booking", but the system is only able to handle "gaming" intents, it may determine it is unable to respond and generate a response indicating it is fully unable to respond (e.g., a "0" or other "negative" response value). Also, for example, the request may include a value for an intent slot parameter and the system may determine whether it can respond to the request based on whether it can respond to the intent slot parameter and/or the value. For instance, if the intent slot parameter is not supported by the system, but other parameters and values of the agent request are, the system may generate a response indicating it is able to handle some, but not all of the parameters of the agent request (e.g., a "0.5" or other "partial" response value). As yet another example, the intent slot parameter may be supported by the system, but the particular value may not be supported by the system. For instance, the intent slot parameter may be a "geographic region" parameter and the value may be a geographic region not serviced by the system. In such a scenario, the system may generate a response indicating it is unable to respond—or more particularly indicating that it is able to handle some, but not all of the values of the agent request.

At block 756, the system provides (e.g., transmits) the agent response to the automated assistant without being invoked by the automated assistant.

At block 758, the system may thereafter receive an invocation request from the automated assistant. In some implementations, the invocation request may indicate that the system should effectively or actually take over the dialog. If the invocation request indicates that the system should actually take over the dialog, the system may establish a direct network communications session with a corresponding client device. If the invocation request indicates that the system should effectively take over the dialog, the system may take over the dialog while still communicating with the component that provided the invocation request and/or a related component.

At block 760, the system generates responsive content based on value(s) for parameter(s) that are included in the invocation request.

At block 762, the system provides the responsive content. For example, where the invocation request indicates the system should effectively take over the dialog and/or should only perform an intended action without engaging in a dialog, the system may transmit the responsive content to the component (or related component) that sent the invocation request. Also, for example, where the invocation request indicates the system should actually take over the dialog, the system may transmit the responsive content to a corresponding client device.

Blocks 758, 760, and 762 are illustrated in broken lines in FIG. 7 to indicate that they may not be performed in some situations. For example, as described herein, in some implementations the system may receive an agent request without ever receiving a corresponding invocation request.

Figure 8:
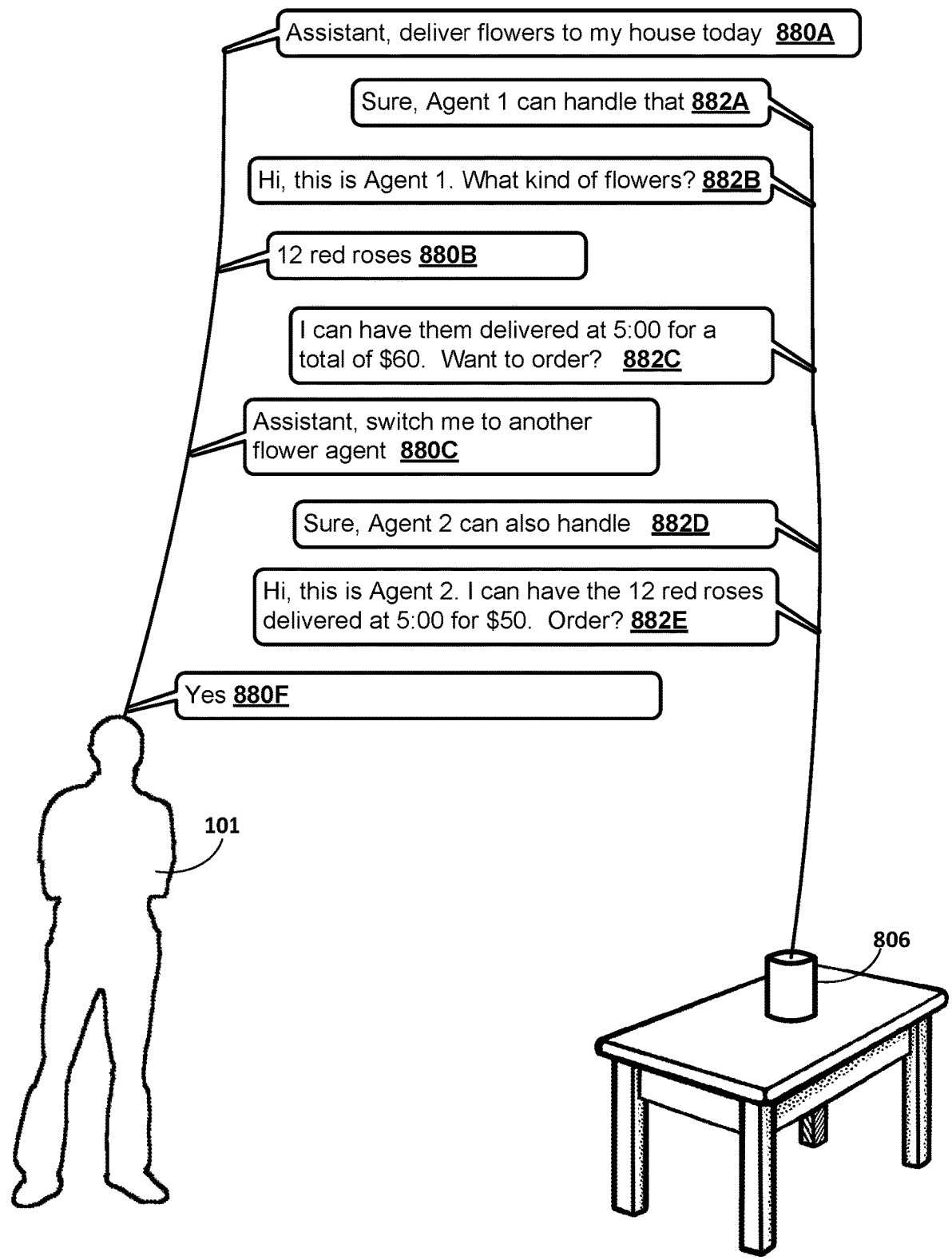
FIGS. 8 and 9 each illustrate: a user; a client device; and an example dialog between the user, an automated assistant associated with the client device, and an agent, according to implementations disclosed herein.
Figure 9:
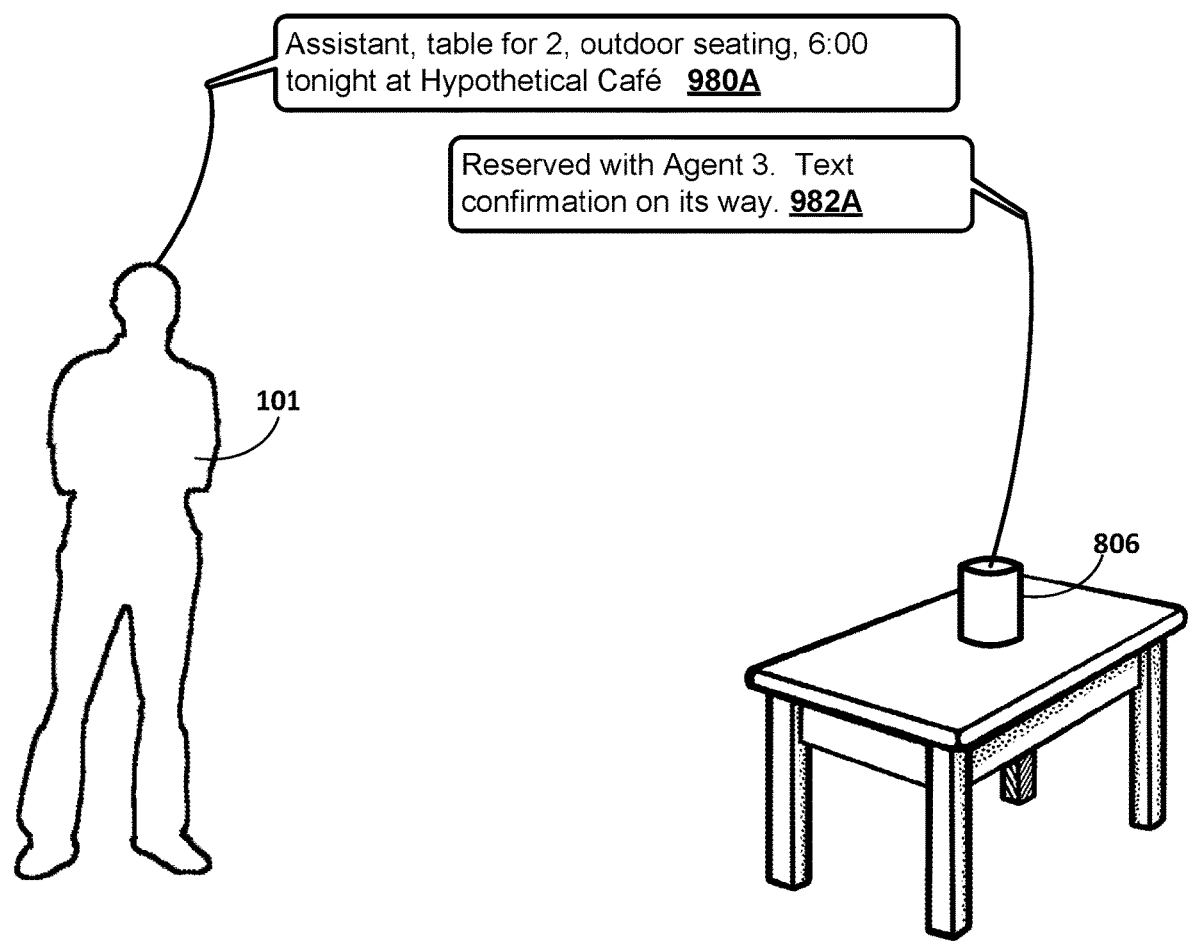

FIGS. 8 and 9 each illustrates a user 101, a voice-enabled client device 806, and an example of dialog that may occur between the user 101, an automated assistant associated with the client device 806, and an agent. The client device 806 includes one or more microphones and one or more speakers. One or more aspects of the automated assistant 110 of FIG. 1 may be implemented on the client device 806 and/or on one or more computing devices that are in network communication with the client device 806. Accordingly, for ease in explanation the automated assistant 110 is referenced in description of FIGS. 8 and 9.

In FIG. 8, the user provides spoken input 880A of "Assistant, deliver flowers to my house today". Voice input corresponding to the spoken input is generated by the device 806 and provided to the automated assistant 110 (e.g., as streaming voice input). Even though the spoken input 880A does not specify a particular agent, the automated assistant 110 may utilize the spoken input 880A to select a single agent, from multiple available agents, based on one or more techniques described herein (e.g., based on an agent selection model).

In response to the spoken input 880A and selecting the single agent, the automated assistant 110 may generate and provide the output 882A "Sure, Agent 1 can handle that". Further, the automated assistant 110 may invoke "Agent 1", which then provides agent output 882B of "Hi, this is Agent 1. What kind of flowers?"

In response to the agent output 882B, the user provides further spoken input 880B of "12 red roses". Voice input corresponding to the spoken input is generated by the device 806 and provided to the automated assistant 110, which forwards the spoken input (or a conversion and/or annotations thereof) to "Agent 1". The further spoken input 880B specifies a value for a previously unspecified "flower type" intent slot parameter of the "order flowers" intent. The automated assistant 110 may update a global value for the "flower type" intent slot parameter based on the further spoken input 880B (either directly, or based on an indication of that value provided by "Agent 1").

In response to the further spoken input 880B, "Agent 1" provides further agent output 882C of "I can have them delivered at 5:00 for a total of $60. Want to order?".

In response to the further agent output 882C, the user provides further spoken input 880C of "Assistant, switch me to another flower agent". The automated assistant 110 can recognize such further spoken input as switching input, and select an appropriate alternative agent. For example, the automated assistant 110 can, based on an agent selection model and/or "live" agent requests, determine that "Agent 2" can handle the intent with the various values for intent slot parameters (including the value for "flower type").

In response to the further spoken input 880C and selecting the alternate agent, the automated assistant 110 may generate and provide the output 882D "Sure, Agent 2 can also handle". Further, the automated assistant 110 invokes "Agent 2", and invokes "Agent 2" with an invocation request that includes the updated global value for the "flower type" intent slot parameter. "Agent 2" then provides agent output 882E of "Hi, this is Agent 2. I can have the 12 red roses delivered at 5:00 for $50. Order?". Notably, this output is generated based on the updated global value for the "flower type" intent slot parameter, which was updated in response to interaction with the previously invoked "Agent 1".

The user then provides further spoken input 880F of "Yes" to cause "Agent 2" to satisfy the intent with the specified values for the intent slot parameters.

In FIG. 9, the user provides spoken input 980A of "Assistant, table for 2, outdoor seating, 6:00 tonight at Hypothetical Café". Voice input corresponding to the spoken input is generated by the device 806 and provided to the automated assistant 110 (e.g., as streaming voice input). Even though the spoken input 980A does not specify a particular agent, the automated assistant 110 may utilize the spoken input 980A to select a single agent, from multiple available agents, based on one or more techniques described herein (e.g., based on an agent selection model).

In response to the spoken input 980A and selecting the single agent, the automated assistant 110 may invoke "Agent 3". "Agent 3" is able to satisfy the intent with the specified values for the intent slot parameters, without engaging in any further dialog with the user. "Agent 3" generates responsive content to provide to the automated assistant 110 indicating the reservation is complete and a text confirmation will be sent to the user 101. In response, the automated assistant 110 provides output 982A of "Reserved with Agent 3. Text confirmation on its way."

Figure 10:
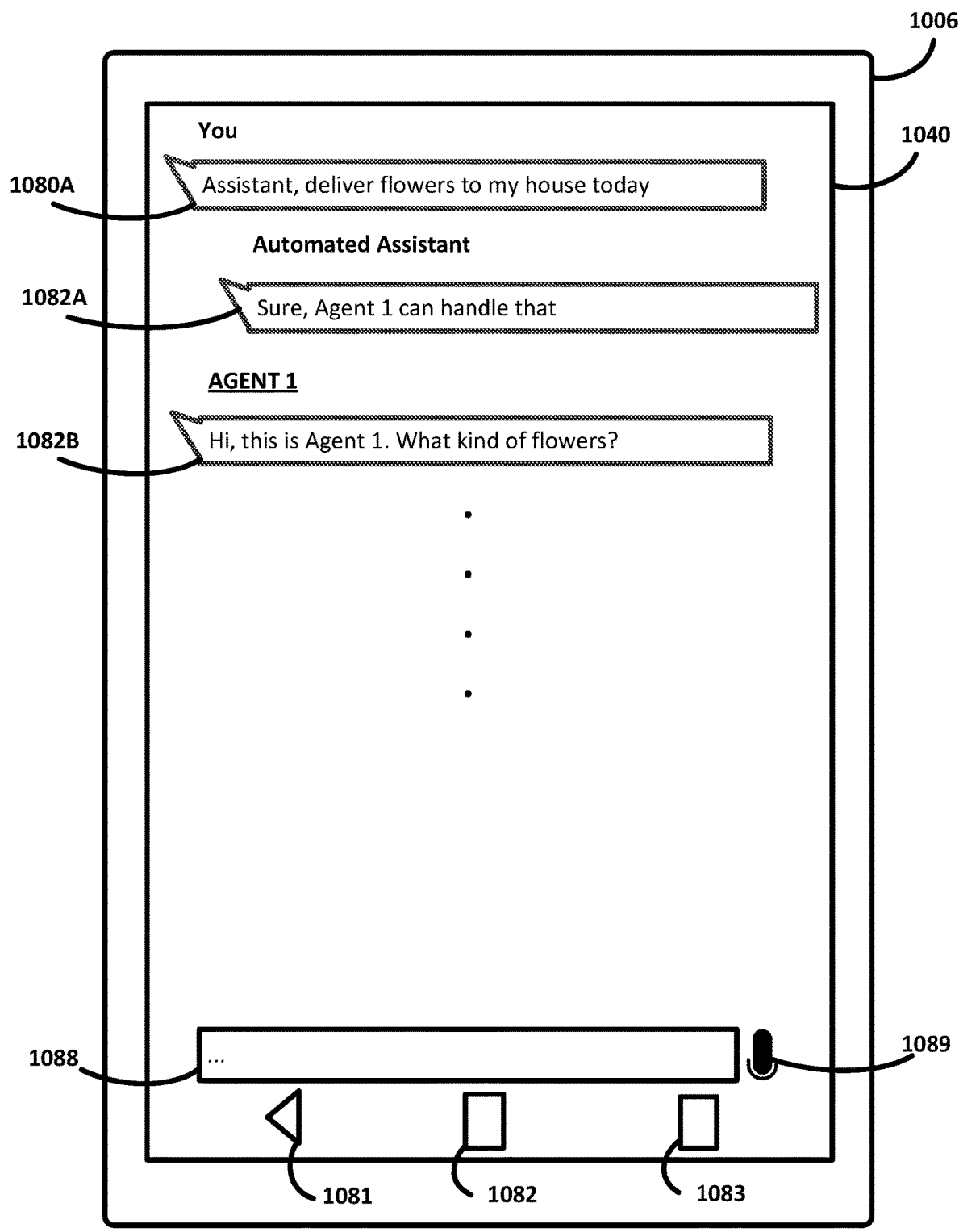
FIG. 10 illustrates: an additional client device; and an example dialog between a user of the client device, an automated assistant associated with the client device, and an agent, according to implementations disclosed herein.

FIG. 10 illustrates another client device 1006 and a display screen 1040 of the client device 1006. The client device 1006 may include and/or be in communication with the automated assistant 110. The display screen 1040 includes a reply interface element 1088 that the user may select to generate user input via a virtual keyboard and a voice reply interface element 1089 that the user may select to generate user input via a microphone. In some implementations, the user may generate user input via the microphone without selection of the voice reply interface element 1089. For example, during the dialog, active monitoring for audible user interface input via the microphone may occur to obviate the need for the user to select the voice reply interface element 1089. In some of those and/or in other implementations, the voice reply interface element 1089 may be omitted. Moreover, in some implementations, the reply interface element 1088 may additionally and/or alternatively be omitted (e.g., the user may only provide audible user interface input). The display screen 1040 also includes system interface elements 1081, 1082, 1083 that may be interacted with by the user to cause the client device 1010 to perform one or more actions.

In FIG. 10, the input 1080A is the same as input 880A in FIG. 8. Likewise, outputs 1082A and 1082B are the same as outputs 882A and 882B of FIG. 8. FIG. 10 is illustrated as an example of graphical interactions with automated assistant 110 and/or agents (in lieu of the spoken/audible interactions of FIG. 8). Although FIG. 10 illustrates one example of graphical interactions, different examples are contemplated. For example, instead of "Agent 1" providing output 1082B via a common interface with the automated assistant as illustrated in FIG. 10—"Agent 1" may instead be a separate application that is launched and/or brought to the forefront in response to invocation. For instance, after output 1082A of FIG. 10, an "Agent 1" application interface may supplant the automated assistant interface of FIG. 10, then provide output similar to output 1082B.

Figure 11:
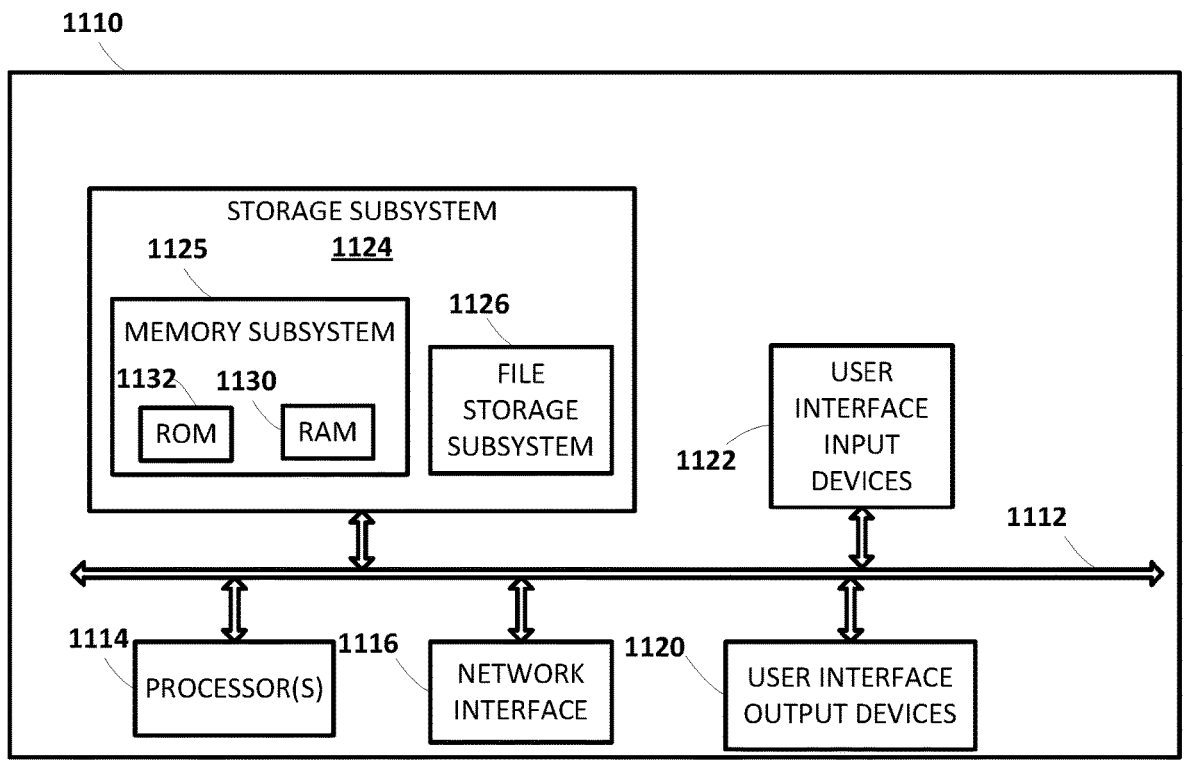
FIG. 11 illustrates an example architecture of a computing device.

FIG. 11 is a block diagram of an example computing device 1110 that may optionally be utilized to perform one or more aspects of techniques described herein. In some implementations, one or more of device 106, automated assistant 110, a 3P agent, and/or other component(s) may comprise one or more components of the example computing device 1110.

Computing device 1110 typically includes at least one processor 1114 which communicates with a number of peripheral devices via bus subsystem 1112. These peripheral devices may include a storage subsystem 1124, including, for example, a memory subsystem 1125 and a file storage subsystem 1126, user interface output devices 1120, user interface input devices 1122, and a network interface subsystem 1116. The input and output devices allow user interaction with computing device 1110. Network interface subsystem 1116 provides an interface to outside networks and is coupled to corresponding interface devices in other computing devices.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1110 to the user or to another machine or computing device.

Storage subsystem 1124 stores programming and data constructs that provide the functionality of some or all of the modules described herein. For example, the storage subsystem 1124 may include the logic to perform selected aspects of the method(s) of FIGS. 4, 5, 6, and/or 7.

These software modules are generally executed by processor 1114 alone or in combination with other processors. Memory 1125 used in the storage subsystem 1124 can include a number of memories including a main random access memory (RAM) 1130 for storage of instructions and data during program execution and a read only memory (ROM) 1132 in which fixed instructions are stored. A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 1124, or in other machines accessible by the processor(s) 1114.

Bus subsystem 1112 provides a mechanism for letting the various components and subsystems of computing device 1110 communicate with each other as intended. Although bus subsystem 1112 is shown schematically as a single bus, alternative implementations of the bus subsystem may use multiple busses.

Computing device 1110 can be of varying types including a workstation, server, computing cluster, blade server, server farm, or any other data processing system or computing device. Due to the ever-changing nature of computers and networks, the description of computing device 1110 depicted in FIG. 11 is intended only as a specific example for purposes of illustrating some implementations. Many other configurations of computing device 1110 are possible having more or fewer components than the computing device depicted in FIG. 11.

In situations in which certain implementations discussed herein may collect or use personal information about users (e.g., user data extracted from other electronic communications, information about a user's social network, a user's location, a user's time, a user's biometric information, and a user's activities and demographic information), users are provided with one or more opportunities to control whether information is collected, whether the personal information is stored, whether the personal information is used, and how the information is collected about the user, stored and used. That is, implementations of the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

The invention claimed is:

1. A method implemented by one or more processors, the method comprising:
   receiving voice input of a user during a human-to-automated assistant dialog;
   converting the voice input into text using a voice to text module;
   determining that the text indicates an agent action and that the text fails to explicitly indicate an agent to be invoked to perform the agent action;
   prior to invoking any agent in response to the natural language input instance, and in response to determining that the text fails to explicitly indicate an agent to be invoked to perform the agent action:
      generating an agent request based on the text, wherein the generated agent request comprises:
         an intent parameter that indicates an intent indicated by the text,
         one or more values for one or more intent slot parameters defined for the intent, and
         an indication that the agent request should not immediately invoke a respective agent;
      selecting multiple agents for the agent request;
      transmitting the agent request to each of the multiple agents;
      receiving, from each of the multiple agents in response to the transmitting, a corresponding response to the agent request, wherein the multiple agents generate the corresponding responses without invocation based on the agent request including the indication that the agent request should not immediately invoke a respective agent, and wherein the responses are each generated based on the intent parameter and the one or more values for the one or more intent slot parameters, and each indicate an ability of a corresponding one of the multiple agents to generate responsive content in response to the agent request;

selecting a particular agent, from the multiple agents, based on the corresponding responses, wherein selecting the particular agent occurs without providing any user interface output that explicitly solicits the user to select between the particular agent and one or more other of the multiple agents;

responsive to the receiving the voice input instance and in response to selecting the particular agent:
transmitting an invocation request to the selected particular agent, wherein the invocation request invokes the particular agent with the intent parameter and the one or more values for the one or more intent slot parameters and causes the particular agent to generate particular responsive content for presentation to the user via one or more user interface output devices, wherein only the selected particular agent is invoked in response to receiving the voice input, and wherein transmitting the invocation request to the particular agent is subsequent to transmitting the agent request to the particular agent and subsequent to receiving, from the particular agent without invocation based on the agent request, the corresponding response from the particular agent;

generating a training instance based on the agent request and the corresponding responses from the multiple agents, generating the training instance comprising generating training instance input based on the agent request and generating training instance output based on the corresponding responses;

applying the training instance input as input to a machine learning model to generate machine learning model output;

updating the machine learning model based on the machine learning model output and the training instance output; and subsequent to updating the machine learning model based on the machine learning model output and the training instance output:
utilizing the machine learning model to predict, based on a subsequent dialog, a corresponding value for each of the multiple agents; and
selecting, based on the corresponding values, only a single of the multiple agents to invoke in the subsequent dialog.

2. The method of claim 1, wherein selecting the particular agent is further based on a quantity of interactions with the particular agent by the user engaged in the human-to-automated assistant dialog.

3. The method of claim 1, wherein selecting the particular agent is further based on a recency of interaction with the particular agent by the user engaged in the human-to-automated assistant dialog.

4. The method of claim 1, wherein selecting the particular agent is further based on:
a quantity of interactions with the particular agent by the user engaged in the human-to-automated assistant dialog; and
a recency of interaction with the particular agent by the user.

5. The method of claim 1, further comprising, after transmitting the invocation request to the selected particular agent:
receiving the particular responsive content from the particular agent in response to the transmitting; and
causing output that is based on the particular responsive content to be presented via the one or more user interface output devices.

6. The method of claim 5, further comprising:
receiving, while the particular agent is invoked and subsequent to causing the output to be presented, an additional natural language input instance generated based on additional user interface input provided by the user;
determining that the additional natural language input instance indicates a desire to switch to an alternative agent of the plurality of agents; and
in response to determining that the additional natural language input instance indicates the desire to switch to the alternative agent:
transmitting an additional invocation request to the alternative agent, wherein the additional invocation request includes at least one value that is based on the natural language input instance or a further natural language input instance received while the particular agent was invoked.

7. A system, comprising:
memory storing instructions;
one or more processors executing the instructions to cause performance of a method comprising:
receiving voice input of a user during a human-to-automated assistant dialog;
converting the voice input into text using a voice to text module;
determining that the text indicates an agent action and that the text fails to explicitly indicate an agent to be invoked to perform the agent action;
prior to invoking any agent in response to the natural language input instance, and in response to determining that the text fails to explicitly indicate an agent to be invoked to perform the agent action:
generating an agent request based on the text, wherein the generated agent request comprises:
an intent parameter that indicates an intent indicated by the text,
one or more values for one or more intent slot parameters defined for the intent, and
an indication that the agent request should not immediately invoke a respective agent;
selecting multiple agents for the agent request;
transmitting the agent request to each of the multiple agents;
receiving, from each of the multiple agents in response to the transmitting, a corresponding response to the agent request, wherein the multiple agents generate the corresponding responses without invocation based on the agent request including the indication that the agent request should not immediately invoke a respective agent, and wherein the responses are each generated based on the intent parameter and the one or more values for the one or more intent slot parameters, and each indicate an ability of a corresponding one of the multiple agents to generate responsive content in response to the agent request;

selecting a particular agent, from the multiple agents, based on the corresponding responses, wherein selecting the particular agent occurs without providing any user interface output that explicitly solicits the user to select between the particular agent and one or more other of the multiple agents; and responsive to the receiving the voice input instance and in response to selecting the particular agent:

transmitting an invocation request to the selected particular agent, wherein the invocation request invokes the particular agent with the intent parameter and the one or more values for the one or more intent slot parameters and causes the particular agent to generate particular responsive content for presentation to the user via one or more user interface output devices, wherein only the selected particular agent is invoked in response to receiving the voice input, and wherein transmitting the invocation request to the particular agent is subsequent to transmitting the agent request to the particular agent and subsequent to receiving, from the particular agent without invocation based on the agent request, the corresponding response from the particular agent;

generating a training instance based on the agent request and the corresponding responses from the multiple agents, generating the training instance comprising generating training instance input based on the agent request and generating training instance output based on the corresponding responses;

applying the training instance input as input to a machine learning model to generate machine learning model output;

updating the machine learning model based on the machine learning model output and the training instance output; and subsequent to updating the machine learning model based on the machine learning model output and the training instance output:

utilizing the machine learning model to predict, based on a subsequent dialog, a corresponding value for each of the multiple agents; and selecting, based on the corresponding values, only a single of the multiple agents to invoke in the subsequent dialog.

8. The system of claim 7, wherein selecting the particular agent is further based on a quantity of interactions with the particular agent by the user engaged in the human-to-automated assistant dialog.

9. The system of claim 7, wherein selecting the particular agent is further based on a recency of interaction with the particular agent by the user engaged in the human-to-automated assistant dialog.

10. The system of claim 7, wherein selecting the particular agent is further based on:

a quantity of interactions with the particular agent by the user engaged in the human-to-automated assistant dialog; and a recency of interaction with the particular agent by the user.

11. The system of claim 7, wherein the method further comprises, after transmitting the invocation request to the selected particular agent:

receiving the particular responsive content from the particular agent in response to the transmitting; and causing output that is based on the particular responsive content to be presented via the one or more user interface output devices.

12. The system of claim 11, wherein the method further comprises:

receiving, while the particular agent is invoked and subsequent to causing the output to be presented, an additional natural language input instance generated based on additional user interface input provided by the user;

determining that the additional natural language input instance indicates a desire to switch to an alternative agent of the plurality of agents; and in response to determining that the additional natural language input instance indicates the desire to switch to the alternative agent:

transmitting an additional invocation request to the alternative agent, wherein the additional invocation request includes at least one value that is based on the natural language input instance or a further natural language input instance received while the particular agent was invoked.

* * * * *